US008660961B2

(12) United States Patent
Raley et al.

(10) Patent No.: US 8,660,961 B2
(45) Date of Patent: Feb. 25, 2014

(54) METHOD, SYSTEM, AND DEVICE FOR LICENSE-CENTRIC CONTENT CONSUMPTION

(75) Inventors: Michael Charles Raley, Downey, CA (US); Eddie J. Chen, Rancho Palos Verdes, CA (US)

(73) Assignee: ContentGuard Holdings, Inc., Plano, TX (US)

( * ) Notice: Subject to any disclaimer, the term of this patent is extended or adjusted under 35 U.S.C. 154(b) by 1727 days.

(21) Appl. No.: 10/990,755

(22) Filed: Nov. 18, 2004

(65) Prior Publication Data

US 2006/0107046 A1    May 18, 2006

(51) Int. Cl.
*G06Q 99/00* (2006.01)
(52) U.S. Cl.
USPC ............................................. 705/51; 705/59
(58) Field of Classification Search
USPC ......................... 705/50–51, 59; 713/150, 168
See application file for complete search history.

(56) References Cited

U.S. PATENT DOCUMENTS

| | | | |
|---|---|---|---|
| 4,159,468 A | 6/1979 | Barnes et al. | |
| 4,200,700 A | 4/1980 | Mäder | |
| 4,361,851 A | 11/1982 | Asip et al. | |
| 4,423,287 A | 12/1983 | Zeidler | |
| 4,429,385 A | 1/1984 | Cichelli et al. | |
| 4,621,321 A | 11/1986 | Boebert et al. | |
| 4,652,990 A | 3/1987 | Pailen et al. | |
| 4,736,422 A | 4/1988 | Mason | |
| 4,740,890 A | 4/1988 | William | |
| 4,796,220 A | 1/1989 | Wolfe | |
| 4,816,655 A | 3/1989 | Musyck et al. | |
| 4,888,638 A | 12/1989 | Bohn | |
| 4,937,863 A | 6/1990 | Robert et al. | |
| 4,953,209 A | 8/1990 | Ryder et al. | |
| 4,977,594 A | 12/1990 | Shear | |
| 5,014,234 A | 5/1991 | Edwards | |

(Continued)

FOREIGN PATENT DOCUMENTS

| | | |
|---|---|---|
| BR | 9810967 A | 10/2001 |
| EP | 0 067 556 B1 | 12/1982 |

(Continued)

OTHER PUBLICATIONS

Blaze et al, "Divertible Protocols and Atomic Proxy Cryptography" 1998 Advances in Cryptography—Euro Crypt International Conference on the Theory and Application of Crypto Techniques, Springer Verlag, DE.

(Continued)

*Primary Examiner* — James D Nigh
(74) *Attorney, Agent, or Firm* — Marc S. Kaufman; Stephen M. Hertzler; Reed Smith LLP

(57) ABSTRACT

A method, system, and device for license-centric content use or distribution, including a pre-existing digital rights management (DRM) system having a unique interface to a repository of data thereof to govern use of content; a shared license repository configured to access the data to govern the use of the content and to communicate with the unique interface of the pre-existing DRM system; and a user interface configured to interact with the pre-existing DRM system, and configured to allow the user to send a license associated with the content from the shared license repository to the pre-existing DRM system or to another shared license repository.

123 Claims, 4 Drawing Sheets

(56) References Cited

U.S. PATENT DOCUMENTS

| | | | |
|---|---|---|---|
| 5,058,162 A | 10/1991 | Santon et al. | |
| 5,129,083 A | 7/1992 | Cutler et al. | |
| 5,138,712 A | 8/1992 | Corbin | |
| 5,174,641 A | 12/1992 | Lim | |
| 5,204,897 A | 4/1993 | Wyman | |
| 5,247,575 A | 9/1993 | Sprague et al. | |
| 5,260,999 A | 11/1993 | Wyman | |
| 5,276,444 A | 1/1994 | McNair | |
| 5,287,408 A | 2/1994 | Samson | |
| 5,291,596 A | 3/1994 | Mita | |
| 5,293,422 A | 3/1994 | Loiacono | |
| 5,335,275 A | 8/1994 | Millar et al. | |
| 5,337,357 A | 8/1994 | Chou et al. | |
| 5,386,369 A | 1/1995 | Christiano | |
| 5,390,297 A | 2/1995 | Barber et al. | |
| 5,414,852 A | 5/1995 | Kramer et al. | |
| 5,453,601 A | 9/1995 | Rosen | |
| 5,485,577 A | 1/1996 | Eyer et al. | |
| 5,504,816 A | 4/1996 | Hamilton et al. | |
| 5,530,235 A | 6/1996 | Stefik et al. | |
| 5,535,276 A | 7/1996 | Ganesan | |
| 5,553,143 A | 9/1996 | Ross et al. | |
| 5,557,678 A | 9/1996 | Ganesan | |
| 5,564,038 A | 10/1996 | Grantz et al. | |
| 5,619,570 A | 4/1997 | Tsutsui | |
| 5,625,690 A | 4/1997 | Michel et al. | |
| 5,629,980 A | 5/1997 | Stefik et al. | |
| 5,636,346 A | 6/1997 | Saxe | |
| 5,638,443 A | 6/1997 | Stefik et al. | |
| 5,638,513 A | 6/1997 | Ananda | |
| 5,708,709 A | 1/1998 | Rose | |
| 5,715,403 A | 2/1998 | Stefik | |
| 5,745,879 A | 4/1998 | Wyman | |
| 5,764,807 A | 6/1998 | Pearlman et al. | |
| 5,765,152 A | 6/1998 | Erickson | |
| 5,787,172 A | 7/1998 | Arnold | |
| 5,790,677 A | 8/1998 | Fox et al. | |
| 5,812,664 A | 9/1998 | Bernobich et al. | |
| 5,825,876 A | 10/1998 | Peterson | |
| 5,825,879 A | 10/1998 | Davis | |
| 5,838,792 A | 11/1998 | Ganesan | |
| 5,848,154 A | 12/1998 | Nishio et al. | |
| 5,848,378 A | 12/1998 | Shelton et al. | |
| 5,850,443 A | 12/1998 | Van Oorschot et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,933,498 A | 8/1999 | Schneck et al. | |
| 5,940,504 A | 8/1999 | Griswold | |
| 5,982,891 A | 11/1999 | Ginter et al. | |
| 5,987,134 A | 11/1999 | Shin et al. | |
| 5,999,624 A | 12/1999 | Hopkins | |
| 6,006,332 A | 12/1999 | Rabne et al. | |
| 6,020,882 A | 2/2000 | Kinghorn et al. | |
| 6,047,067 A | 4/2000 | Rosen | |
| 6,073,234 A | 6/2000 | Kigo et al. | |
| 6,091,777 A | 7/2000 | Guetz et al. | |
| 6,112,239 A | 8/2000 | Kenner et al. | |
| 6,135,646 A | 10/2000 | Kahn et al. | |
| 6,141,754 A | 10/2000 | Choy | |
| 6,157,719 A | 12/2000 | Wasilewski et al. | |
| 6,169,976 B1 | 1/2001 | Colosso | |
| 6,185,683 B1 | 2/2001 | Ginter et al. | |
| 6,189,037 B1 | 2/2001 | Adams et al. | |
| 6,189,146 B1 | 2/2001 | Misra et al. | |
| 6,209,092 B1 | 3/2001 | Linnartz | |
| 6,216,112 B1 | 4/2001 | Fuller et al. | |
| 6,219,652 B1 | 4/2001 | Carter et al. | |
| 6,236,971 B1 | 5/2001 | Stefik et al. | |
| 6,307,939 B1 | 10/2001 | Vigarie | |
| 6,353,888 B1 | 3/2002 | Kakehi et al. | |
| 6,385,596 B1* | 5/2002 | Wiser et al. | 705/51 |
| 6,397,333 B1 | 5/2002 | Söhne et al. | |
| 6,401,211 B1 | 6/2002 | Brezak, Jr. et al. | |
| 6,405,369 B1 | 6/2002 | Tsuria | |
| 6,424,717 B1 | 7/2002 | Pinder et al. | |
| 6,424,947 B1 | 7/2002 | Tsuria et al. | |
| 6,449,367 B2 | 9/2002 | Van Wie et al. | |
| 6,487,659 B1 | 11/2002 | Kigo et al. | |
| 6,516,052 B2 | 2/2003 | Voudouris | |
| 6,516,413 B1 | 2/2003 | Aratani et al. | |
| 6,523,745 B1 | 2/2003 | Tamori | |
| 6,587,127 B1 | 7/2003 | Leeke et al. | |
| 6,796,555 B1 | 9/2004 | Blahut | |
| 6,944,776 B1* | 9/2005 | Lockhart et al. | 713/176 |
| 7,203,966 B2 | 4/2007 | Abburi et al. | |
| 7,424,034 B2 | 9/2008 | Kawaguchi et al. | |
| 7,627,530 B2 | 12/2009 | Siegel et al. | |
| 7,703,128 B2 | 4/2010 | Cross et al. | |
| 7,870,397 B2* | 1/2011 | Lee et al. | 713/193 |
| 7,899,187 B2 | 3/2011 | Messerges et al. | |
| 7,950,055 B2 | 5/2011 | Blinn et al. | |
| 8,078,696 B2 | 12/2011 | Lajoie et al. | |
| 2001/0009026 A1 | 7/2001 | Terao et al. | |
| 2001/0011276 A1 | 8/2001 | Durst, Jr. et al. | |
| 2001/0014206 A1 | 8/2001 | Artigalas et al. | |
| 2001/0037467 A1 | 11/2001 | O'Toole, Jr. et al. | |
| 2001/0039659 A1 | 11/2001 | Simmons et al. | |
| 2001/0042043 A1 | 11/2001 | Shear et al. | |
| 2002/0001387 A1 | 1/2002 | Dillon | |
| 2002/0035618 A1 | 3/2002 | Mendez et al. | |
| 2002/0044658 A1 | 4/2002 | Wasilewski et al. | |
| 2002/0056118 A1 | 5/2002 | Hunter et al. | |
| 2002/0069282 A1 | 6/2002 | Reisman | |
| 2002/0073177 A1 | 6/2002 | Clark et al. | |
| 2002/0082939 A1 | 6/2002 | Clark et al. | |
| 2002/0091584 A1 | 7/2002 | Clark et al. | |
| 2002/0099948 A1 | 7/2002 | Kocher et al. | |
| 2002/0127423 A1 | 9/2002 | Kayanakis | |
| 2003/0014496 A1 | 1/2003 | Spencer et al. | |
| 2003/0023564 A1* | 1/2003 | Padhye et al. | 705/54 |
| 2003/0038838 A1 | 2/2003 | Pollitt | |
| 2003/0046407 A1 | 3/2003 | Erickson et al. | |
| 2003/0048907 A1* | 3/2003 | Nakahara et al. | 380/277 |
| 2003/0078891 A1 | 4/2003 | Capitant | |
| 2003/0097567 A1 | 5/2003 | Terao et al. | |
| 2003/0126086 A1 | 7/2003 | Safadi | |
| 2004/0052370 A1 | 3/2004 | Katznelson | |
| 2004/0162786 A1 | 8/2004 | Cross et al. | |
| 2004/0172552 A1 | 9/2004 | Boyles et al. | |
| 2004/0249768 A1* | 12/2004 | Kontio et al. | 705/65 |
| 2004/0249815 A1* | 12/2004 | Lee | 707/9 |
| 2005/0004875 A1* | 1/2005 | Kontio et al. | 705/52 |
| 2005/0044016 A1* | 2/2005 | Irwin et al. | 705/30 |
| 2005/0091508 A1* | 4/2005 | Lee et al. | 713/182 |
| 2005/0119977 A1* | 6/2005 | Raciborski | 705/59 |
| 2005/0149340 A1* | 7/2005 | Murakami et al. | 705/1 |
| 2006/0021056 A1* | 1/2006 | Koppen | 726/26 |
| 2006/0095382 A1* | 5/2006 | Mahlbacher | 705/59 |
| 2006/0265441 A1* | 11/2006 | Andersson et al. | 708/200 |
| 2007/0027814 A1* | 2/2007 | Tuoriniemi | 705/59 |
| 2007/0056040 A1* | 3/2007 | Van Den Heuvel et al. | 726/26 |
| 2007/0250713 A1 | 10/2007 | Rahman et al. | |
| 2008/0098481 A1* | 4/2008 | Lee et al. | 726/26 |
| 2008/0103977 A1* | 5/2008 | Khosravy et al. | 705/59 |
| 2008/0313468 A1 | 12/2008 | Yoshikawa | |
| 2009/0307759 A1 | 12/2009 | Schnell et al. | |

FOREIGN PATENT DOCUMENTS

| | | |
|---|---|---|
| EP | 0 257 585 A2 | 3/1988 |
| EP | 0 262 025 A2 | 3/1988 |
| EP | 0 332 304 A2 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 731 404 A1 | 9/1996 |
| EP | 0 763 936 A2 | 3/1997 |

(56) References Cited

FOREIGN PATENT DOCUMENTS

| | | |
|---|---|---|
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 A2 | 5/2001 |
| GB | 1483282 | 8/1977 |
| GB | 2022969 A | 12/1979 |
| GB | 2236604 A | 4/1991 |
| GB | 2309364 A | 7/1997 |
| GB | 2316503 A | 2/1998 |
| GB | 2354102 A | 3/2001 |
| JP | 3-063717 A | 3/1991 |
| JP | H4-180451 | 6/1992 |
| JP | 5-100939 | 4/1993 |
| JP | 5168039 A2 | 7/1993 |
| JP | 6-131371 A | 5/1994 |
| JP | 7-36768 | 2/1995 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 2001-202088 | 7/2001 |
| JP | 2003-174443 | 6/2003 |
| JP | 2004227282 | 8/2004 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 A1 | 11/1992 |
| WO | WO 93/01550 A1 | 1/1993 |
| WO | WO 93/11480 A1 | 6/1993 |
| WO | WO 94/03003 A1 | 2/1994 |
| WO | WO 96/13814 A1 | 5/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 98/09209 A1 | 3/1998 |
| WO | WO 98/10561 A1 | 3/1998 |
| WO | WO 98/11690 A1 | 3/1998 |
| WO | WO 98/19431 A1 | 5/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/46994 A1 | 8/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | 0135236 | 5/2001 |
| WO | WO 01/37209 A1 | 5/2001 |
| WO | 03/058620 | 7/2003 |
| WO | WO 2004/034223 A2 | 4/2004 |
| WO | WO 2004/103843 | 12/2004 |
| WO | WO 2005010734 A1 * | 2/2005 ................ G06F 1/00 |

OTHER PUBLICATIONS

Blaze et al, "Atomic Proxy Cryptography" Draft (Online) (Nov. 2, 1997) XP002239619 Retrieved from the Internet.
No Author, "Capability- and Object-Based Systems Concepts," Capability-Based Computer Systems, pp. 1-19 (no date).
Cox, "Superdistribution" Wired Magazine (Sep. 1994) XP002233405 URL:http://www.wired.com/wired/archive/2.09/superdis_pr.html>.
Dunlop et al, Telecommunications Engineering, pp. 346-352 (1984).
Elgamal, "A Public Key Cryptosystem and a Signature Scheme Based on Discrete Logarithms," IEEE Transactions on Information Theory IT-31(4):469-472 (Jul. 1985).
Gheorghiu et al., "Authorization for Metacomputing Applications" (no date).
Iannella, ed., Open Digital Rights Language (ODRL), pp. 1-31 (Nov. 21, 2000).
Kahle, wais.concepts.txt, Wide Area Information Server Concepts, Thinking Machines Version 4, Draft, pp. 1-18 (Nov. 3, 1989).
Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.
Kahn et al, "The Digital Library Project, vol. 1: The World of Knowbots (Draft), An Open Architecture for a Digital Library System and a Plan for its Development," Corporation for National Research Initiatives, pp. 1-48 (Mar. 1988).
Kohl et al, Network Working Group Request for Comments: 1510, pp. 1-112 (Sep. 1993).
Lee et al, CDMA Systems Engineering Handbook (1998) [excerpts but not all pages numbered].
Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.
Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.
Microsoft Word, Users Guide, Version 6.0, pp. 487-89, 549-55, 560-64, 572-75, 599-613, 616-31 (1993).
Ojanperä and Prasad, eds., Wideband CDMA for Third Generation Mobile Communications (1998) [excerpts but not all pages numbered].
Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).
Raggett, (Hewlett Packard), "HTML+(Hypertext markup language)," pp. 1-31 (Jul. 12, 1993) URL:http://citeseer.ist.psu.edu/correct/340709.
Samuelson et al, "Intellectual Property Rights for Digital Library and Hypertext Publishing Systems: An Analysis of Xanadu," Hypertext '91 Proceedings, pp. 39-50 (Dec. 1991).
No Author, "Softlock Services Introduces . . . Softlock Services" Press Release (Jan. 28, 1994).
No Author, "Appendix III—Compatibility with HTML," No Title, pp. 30-31 (no date).
No Editor, No Title, Dictionary pp., pp. 469-472, 593-94 (no date).
Benoit, Digital Television MPEG-1, MPEG-2 and Principles of the DVB System, pp. 75-80, 116-121 (no date).
Benoit, Digital Television MPEG-1, MPEG-2 and Principles of the DVB System, $2^{nd}$ edition, pp. 74-80 (no date).
AH Digital Audio and Video Series, "DTV Receivers and Measurements," Understanding Digital Terrestrial Broadcasting, pp. 159-164 (no date).
O'Driscoll, The Essential Guide to Digital Set-Top Boxes and Interactive TV pp. 6-24 (no date).
Ius Mentis, "The ElGamal Public Key System," pp. 1-2 (Oct. 1, 2005) online at http://www.iusmentis.com/technology/encyrption/elgamal/.
Schneier, "Crypto Bibliography," Index of Crypto Papers Available Online, pp. 1-2 (online) (no date).
No Author, No Title, pp. 344-355 (no date).
No Author, "Part Four Networks," No Title, pp. 639-714 (no date).
Microsoft Word User's Guide, pp. 773-74, 315-16, 487-89, 561-64, 744, 624-33 (1993).
No Author, "What is the ElGamal Cryptosystem," p. 1 (Nov. 27, 2006) online at http://www.x5.net/faqs/crypto/q29.html.

(56) References Cited

OTHER PUBLICATIONS

Johnson et al., "A Secure Distributed Capability Based System," ACM, pp. 392-402 (1985).
Wikipedia, "El Gamal Encyption," pp. 1-3 (last modified Nov. 2, 2006) online at http://en.wikipedia.org/wiki/ElGamal_encryption.
Blaze, "Atomic Proxy Cryptography," p. 1 Abstract (Oct. 20, 1998).
Blaze, "Matt Blaze's Technical Papers," pp. 1-6 (last updated Aug. 6, 2006)].
Online Search Results for "inverted file", "inverted index" from www.techweb.com, www.cryer.co.uk, computing-dictionary. thefreedictionary.com, www.nist.gov.en.wikipedia.org, www.cni.org, www.riscali.co.uk (Jul. 15-16, 2006).
Corporation for National Research Initiatives, "Digital Object Architecture Project", http://www.nnri.reston.va.us/doa.html (updated Nov. 28, 2006).
Stefik, Summary and Analysis of A13 (Kahn, Robert E and Vinton G Cerf, "The Digital Library Project, vol. 1: The World of Knowbots (Draft), An Open Architecture for a Digital Library System and a Plan for its Development," Corporation for National Research Initiatives (Mar. 1988)), pp. 1-25 (May 30, 2007).
Richard Mirabella, GLOBEtrotter Software; "License Management: How Developers Control Software Licensing"; Website: Macrovision http://www.macrovision.com/pdfs/art.1shtml; Sep. 30, 2004; pp. 1-6.
Johnson et al., "A Secure Distributed Capability Based System," Proceedings of the 1985 ACM Annual Conference on the Range of Computing: Mid-80'a Perspective: Mid-80'a Perspective *Association for Computing Machinery* pp. 392-402.
Delaigle, "Digital Watermarking," Spie Conference in Optical Security and Counterfeit Deterrence Techniques, San Jose, CA (Feb. 1996).
Perritt, "Technologies Strategies for Protecting Intellectual Property in the Networked Multimedia Environment," Knowbots, Permissions Headers and Contract Law (Apr. 2-3, 1993).
International Search Report and Written Opinion of the International Searching Authority corresponding to International Application No. PCT/US13/25629, Jun. 17, 2013.
Lampson et al., Authentication in Distributed Systems: Theory and Practice, ACM, 1992, pp. 1-47.
http://www.cs.rice.edu/~dwallach/pub/beam-it.html, Feb. 2000.
Stubblefield et al., A Security Analysis of My.MP3.com and the Beam-it Protocol, Technical Report TR-00-353, Department of Computer Science, Rice University, Feb. 2000, Feb. 2000.
http://toget.pchome.com.tw/category/multimedia/17636.html, Feb. 25, 2000.
http://internet.watch.impress.co.jp/www/article/2000/0113/mymp3.htm, Jan. 13, 2000.
http://en.wikipedia.org/wiki/MP3.com, Mar. 9, 2011.
http://www.wired.com/techbiz/media/news/2000/03/34816, Mar. 15, 2000.
http://www.pcworld.com/article/37542/singing_with_the_enemy_mymp3com_revamps.html, Jan. 4, 2001.
http://www.pcworld.com/article/14922/why_industry_sued_mp3com.html, Jan. 24, 2000.
http://www.wired.com/science/discoveries/news/2000/01/33624, Jan. 12, 2000.
http://www.streamingmedia.com/Articles/Editorial/Featured-Articles/My.MP3.Com-In-Depth-A-Q-%26-A-With-Michael-Robertson-62011.aspx, Feb. 28, 2000.
http://news.cnet.com/2100-1023-235583.html, Jan. 12, 2000.

\* cited by examiner

METHOD, SYSTEM, AND DEVICE FOR LICENSE-CENTRIC CONTENT CONSUMPTION

BACKGROUND OF THE INVENTION

1. Field of the Invention

The present invention generally relates to the field of digital rights management, and more particularly to a method, system, and device for storage of, access to, and management of licenses for digital content.

2. Discussion of the Background

In the early days of computer use, the consumer's view was "application-centric." For example, when consumers wanted to consume digital content, they first opened the appropriate application, such as a word processor. Consumers then accessed the content from within the application.

The current state of the art promotes a "content-centric" view. For example, when consumers want to consume digital content, they double-click the file, including the content, in their file system explorer, and the associated content consumption application launches. The right to consume content is often tied to a particular embodiment of such content. For example, the right to view a movie is tied to physical possession of a DVD. If the content is being protected by a digital rights management (DRM) system, use of that content is predicated upon use of the particular DRM system originally used to protect the content. For example, if the consumer purchased a license for content from company A, the consumer must have company A's DRM system installed on the consumption device to consume such content.

Most of the DRM systems available in the market today have one thing in common, in that they enforce usage rules, as outlined by the content owner or the content distributor in a license. The license may be embedded in the content, or it may be a separate license, which may be machine readable or human readable, such as a click-through license or legal contract. The DRM system interprets the license to identify what the consumer is permitted to do with the content, and restricts the consumer from doing things that are not permitted. The mechanisms that the various DRM systems use to accomplish this task vary widely. For example, many DRM systems express, store, and maintain licenses in a proprietary manner. A consumer typically acquires a DRM system, and requests content provisioned for that system. A content instance then is prepared with encryption or formatting, coupled with other trust and security technologies, that allow the content instance to be used only with a particular DRM implementation. In the case of a digital license, the license typically is stored in a proprietary repository of the DRM system or as part of the content.

Tying consumption of content to a particular combination of consumption application, consumption device, and/or DRM system places limitations on the consumer's purchasing, and consumption habits. However, consumers want to purchase content from a variety of sources (e.g., brick and mortar stores, satellite/cable, internet download, and the like) in a variety formats (e.g., DVD, Redbook audio, computer DVD, streaming, and the like), for a variety of devices (e.g., PCs, home media center, set top boxes, car stereos, mobile phones, portable media players, devices networked to remote locations, and the like).

Consumers may be reluctant to purchase content, because the DRM systems that protect the content may not exist in the future (e.g., in the case of a time-expired DRM system), the company may be out of the business, or the DRM system may not be compatible with the devices that the consumers want to use to consume the content (e.g., in the case of a platform-restricted DRM system). In many cases, the consumer may have devices that can render the content, but such devices may not have the required DRM system.

Consumers also may be reluctant to purchase content, because the format or medium in which the content is currently available may be superseded by a superior format or medium (e.g., DVD may be superseded by high-definition DVD). However, consumers do not want their purchase to become obsolete, requiring them to repurchase the same content in the future.

Consumers must install, manage, and interact with various combinations of consumption devices, consumption applications, and DRM systems in order to use their content, which puts a great burden on the consumer. For example, a consumer's experience in using content for which rights are managed by a particular DRM system is unique to such DRM system. The consumer cannot get an inventory of all the licenses he has purchased, because each license is stored in the proprietary repository for the DRM system that created the license. If a consumer has licenses that are constructed for four different DRM systems, that consumer will have four unique experiences in understanding, managing, and using such licenses.

Consumers also want all content to be available for any suitable device capable of rendering the content. Consumers also want to purchase the content once, and to be able to use that content at any suitable time in the future. Content owners want to make their content accessible to consumers in accordance with usage rules stipulated in a license. Neither the content owner nor the consumer wants to be locked into a particular DRM system. DRM should not be a barrier to such goals. The fact that the current "content-centric" view does create such barriers hurts the content owners, because it limits a consumer's willingness to purchase content.

In an effort to address some of these issues, various attempts to promote interoperability among DRM systems are currently underway. If successfully implemented, interoperability among DRM systems would enable consumers to access their content in the format, location, time, and device of their choosing assuming such rights are granted by the content owner or content distributor. Consumers develop a sense of ownership of the digital content that they have purchased, because they can use such content at any suitable time, and anywhere, regardless of the DRM system or version of such system that is used to enforce the corresponding license. However, there are several barriers to accomplishing DRM interoperability in an ad hoc fashion. For example, with respect to multiplicity, setting up proprietary relationships among various DRM systems is an N-factorial problem for all the permutations.

With respect to security, DRM systems offer different levels of enforcement. If content can travel to any compatible DRM system, a possible security problem is created. Consumers may move all their content to the least secure system, in order to take advantage of the lower level of rights enforcement. This fosters an environment in which the least secure DRM systems are the most widely used.

With respect to support of usage rules in licenses, DRM systems enforce different sets of licensing conditions. Once again, if content can travel to any compatible DRM system, a possible security problem is created. For example, a consumer may move content from a DRM system that allows a one-day rental to a system that does not support the one-day rental restriction, in order to use the content beyond the one-day rental period.

With respect to expressions of usage rules, DRM systems use different mechanisms to specify the usage rules assigned to content. A DRM system may apply a fixed set of rules to all content types and/or instances, or such system may apply usage rules to content on an instance-by-instance basis. DRM systems that apply usage rules to individual content instances vary in their ability to express types of usage rules. For example, DRM system A may enable content owners to stipulate that content can be viewed, but not copied. DRM system B may provide this same capability, but also enable content owners to stipulate that content may be played only once. DRM system C may use a language to offer greater flexibility in the expression of usage rules. These variations in the requirements, and capabilities of the various DRM systems for expressing usage rules make it difficult to implement interoperability.

With respect to user experience, each DRM system has a proprietary user interface that consumers use to understand, consume, and inventory the content to which the consumers have access. Therefore, there is no consistency of user experience across DRM systems.

With respect to license acquisition, when a consumer wants to acquire a license for content, the supplier of the license must understand the DRM system, and format, in order to provide content compatible with that combination of content, device, and DRM system.

There are standards groups, such as ISO MPEG-21, and the Open Mobile Alliance (OMA), that intend to accomplish DRM interoperability, by creating standard DRM system, and interfaces, including content format, client/server communication protocol, content protection method, content identification method, rights expressions, and points of interoperability that enable the content to be exchanged among the various conforming DRM systems. There are other standard groups, such as ISO MPEG-21 REL Working Group, TV-Anytime Rights Management and Protection Group, ISO SC36, IEEE Learning Technology Standards Committee, and Open eBook Forum (OeBF) Rights and Rules Working Group that are focused on establishing a common expression of rights (Rights Expression Language, REL) as the primary means to achieve interoperability. Standardization of a REL is analogous to standardizing a common message exchange format. The advantages are that all conforming systems can communicate with each other, and exchange, and share licenses in an interoperable way, wherein the cost of conformance is low compared to a complete DRM system, and the message (REL) is neutral to, and does not dictate platforms, designs, and implementation. Such approach enables technology providers with different platform agendas to compete on equal footings, while maintaining sufficient interoperability.

Although the various standardization efforts may remove some of the major barriers listed above, many major barriers remain. For example, with respect to creating a standard, standardized DRM systems are extremely difficult to create, because standardization requires that all participants in the value chain, from content owners to rendering device manufacturers, agree on the system's requirements, and achieving such agreement is fraught with complications. Each content owner has their own requirements for the level of security, the usage rules needed in licenses, and the like. A device manufacturer may be reluctant to enforce licenses, because the inconveniences may be disincentive for the consumer to buy. Also this may limit the use of functionality that differentiates the manufacturer from competitors. In addition, not all business models need the same level of security or usage restrictions. For example, commercial broadcast content requires that embedded commercials are watched, whereas distribution of audio MP3s requires restrictions on copying. Even if standards are established, the standards will tend to address market segments that share common security requirements. Ad hoc interoperability across market segments will continue to be problematic.

With respect to international support, as difficult as it is to standardized DRM systems for one country, and the intellectual property laws thereof, it will be nearly impossible to create a globally standardized DRM system. Doing so would require that all countries agree on intellectual property, and usage laws.

With respect to life cycle, like most digital entities, licenses have lifecycles. Licenses are created, used to create new licenses, destroyed, expired, revoked, exercised, transferred, shared, and the like. Although an interoperable expression of rights is valuable in creating interoperable DRM systems, it does not provide all the functionality required to enable such systems to participate in the entire lifecycle of a digital license.

Because of these and other difficulties, the best that can be hoped for is creation of DRM standards for a given market in a given country (e.g., DVD movies in the United States). Accordingly, with current DRM system implementations, the consumer is destined to deal with multiple DRM systems and DRM interoperability problems.

SUMMARY OF THE INVENTION

Therefore, there is a need for a method, system, and device that addresses the above and other problems with conventional content-centric systems, and methods. The above and other needs are addressed by the exemplary embodiments of the present invention, which provide a method, system, and device that can be deployed, and that significantly improve the consumer's experience by promoting a "license-centric" approach to digital content distribution and rights management. An exemplary shared license repository can be configured to implement a rich set of lifecycle capabilities (e.g., including peer-to-peer license transfer, renewal, search, acquisition, conversion from DRM to DRM, and the like). The exemplary embodiments enable consumers to choose from a variety of repositories, such as handheld devices or web services, based on preferences of the consumers. The exemplary embodiments improve the consumer's experience in dealing with a multitude of heterogeneous DRM systems, by providing mechanisms, and interfaces by which the shared license repository can interoperate with proprietary DRM systems.

Accordingly, in exemplary aspects of the present invention, a method, system, and device for license-centric content use or distribution are provided, including a pre-existing digital rights management (DRM) system having a unique interface to a repository of data thereof to govern use of content; a shared license repository configured to access the data to govern the use of the content and to communicate with the unique interface of the pre-existing DRM system; and a user interface configured to interact with the pre-existing DRM system, and configured to allow the user to send a license associated with the content from the shared license repository to the pre-existing DRM system or to another shared license repository.

Still other aspects, features, and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings, in which like reference numerals refer to similar elements, and in which.

DETAILED DESCRIPTION OF THE PREFERRED EMBODIMENTS

Figure 1:
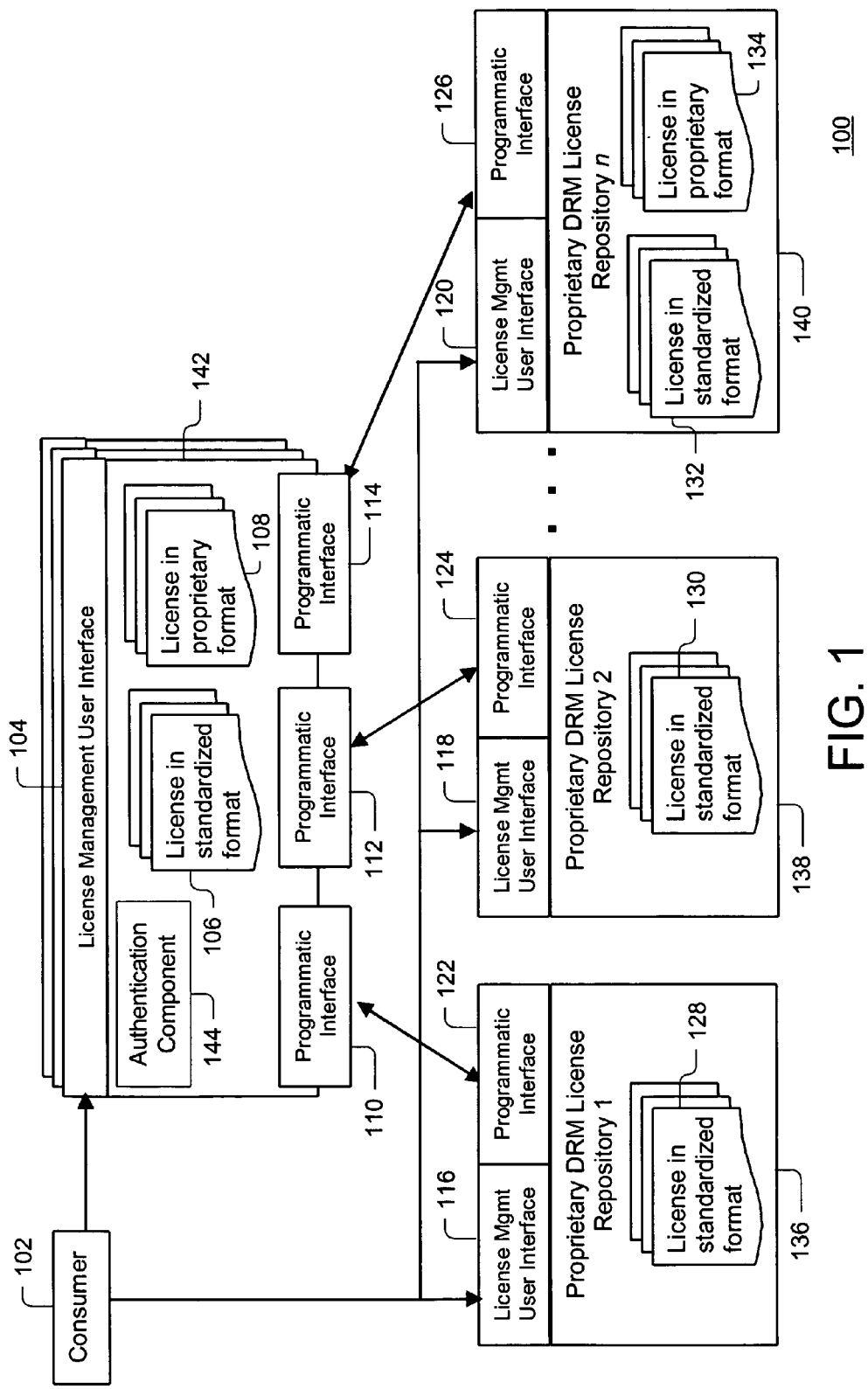
FIG. 1 illustrates an exemplary system for describing interactions among exemplary components.

The present invention includes recognition that in the current state of digital content consumption, a "content-centric" approach marries the content being consumed to a particular consumption application. For example, when a consumer want to consume digital content, the consumer double-clicks a file including the content in the file system explorer of the consumer, and the appropriate content consumption application launches. The right to consume content is often tied to a particular embodiment of such content. For example, the right to view a movie is tied to physical possession of a DVD. If the content is being protected by a digital rights management (DRM) system, use of that content is predicated upon use of the particular DRM system originally used to protect the content. For example, if the consumer purchased a license for content from company A, the consumer must have company A's DRM system installed on the consumption device to consume the corresponding content.

The exemplary embodiments improve upon the content-centric model, by introducing the concept of "license-centric" digital rights management. Consumers want to focus on the rights that they have to use content. Consumers want to be able to easily manage such rights. Consumers do not want the use of content to be limited to a specific combination of content media or format, consuming application, consuming device, and DRM system. In the context of the exemplary embodiments, a license can include a representation of usage rules captured using rights expressions. A license can convey the full context for the rights that are granted. The information captured in a license can include the grantor of the rights, the grantee of the rights, the content, the permitted uses, and the associated terms and conditions. A rights expression can include the manifestation of rights in digital form. Examples of rights expressions can include rights based on, for example, XML-based rights expression languages, such as ISO MPEG REL, XrML, SAML, XACML, ODRL, OMA REL, data structures, bit-fields, and the like.

With the exemplary embodiments consumers acquire (e.g. purchase, rent, exchange, and subscribe) licenses for content, and can use such licenses to use (e.g. consume, render, distribute, and share) the content, regardless of the consuming application or device used, the content distribution media, the DRM system used to enforce licensing terms, and the like. For example, a consumer can purchase a license for watching a movie, and such license need not be tied to a particular embodiment of such movie, such as a DVD. If the same movie is available on a different media, such as a pay-per-view broadcast or a high-definition DVD, the license of the consumer is still valid for watching that movie, assuming the license does permit such rendition. In a further example, the consumer acquires a license to play a movie on any devices within his home domain. The license can be represented as an icon on his desktop. When the license icon is dropped to DRM Player I (e.g., Real Player), the movie plays on his PC monitor. When the same license icon is dragged to DRM Player II (e.g., Windows Media Player), the movie also plays (e.g. on a large screen TV driven by DRM Player II). The DRM Players fetch the content (e.g., as required) associated with the license suited for its rendering environment. By the same token, when the license is transferred to a mobile phone or a portable player, these devices also can fetch (e.g., as required) and render the content, as long as the devices belong to the home domain. This is much more convenient to the consumers than the state of the art DRM systems.

The exemplary embodiments enable consumers to access their inventory of purchased licenses, regardless of the consumer's location, the consuming application or device, or the proprietary DRM system that created the licenses. The exemplary embodiments include an exemplary license repository that provides consumers with a single point of contact to manage all their licenses. The exemplary license repository offers a consistent user interface to disparate DRM systems, while facilitating interoperability among such systems. The exemplary embodiments include the storage and management of digital licenses, and the interfaces that provide access to such licenses.

Accordingly, in contrast to the systems on the market today, the exemplary embodiments employ a "license-centric" approach to DRM-enabled digital content distribution. Consumers acquire licenses for content, and can use such licenses to use the content, regardless of the consuming application or device used, the content distribution media, the DRM system used to enforce licensing terms, and the like. For example, a consumer can purchase a license for a music track, and the license need not be tied to a particular embodiment of the music, such as a CD. If the same music is available on a different media, such as an MP3 file for download, the consumer's license is still valid, and applicable assuming the license permits such rendition.

To enable such a "license-centric" approach, the exemplary embodiments improve the consumer's experience by enabling the consumer to focus on licenses, rather than on instances of content. The exemplary embodiments improve the consumer's experience by enabling the consumer to better understand, and leverage their licenses, to accomplish life-cycle functions, such acquisition, peer-to-peer transfer (e.g., loan, sell, and the like), search, renew, archive, inventory, and the like. The exemplary embodiments provide a consistent user experience, and a single point of contact for using and managing all licenses, regardless of the consumer's location, the consuming device, or the entities (e.g. proprietary DRM systems, content owners, and content distributors) that created the licenses. The exemplary embodiments offer a minimal, yet sufficient, level of interoperability among different DRM systems, among different instances of the same DRM system, and among different versions of the same DRM system.

To provide such advantages, the exemplary embodiments provide mobile access to a shared digital license repository, and provide lifecycle management for stored licenses. The exemplary embodiments include the storage of digital licenses, and the interfaces that provide access to such licenses.

Referring now to the drawings, wherein like reference numerals designate identical or corresponding parts throughout the several views, and more particularly to FIG. 1 thereof, there is illustrated a system 100 for license-centric content consumption, according to an exemplary embodiment. In FIG. 1, the exemplary system 100 for license-centric content consumption can include licenses 106, 108, 128, 130, 132, and 134 that express usage rules for content. The format of the licenses may be standardized, as in licenses 106, 128, 130, and 132, or proprietary, as in licenses 108, and 134. Some proprietary licenses may be legal terms and conditions that the user agrees to when they acquire the content, the presence of the content within the proprietary DRM system, and an understanding of these terms and conditions forms the basis of the proprietary license. The exemplary system 100 can include a shared digital license repository 142 that can be used by one or shared among multiple DRM systems, and/or instances of DRM systems 136, 138, and 140.

The shared digital license repository 142 can include one or more programmatic interfaces 110, 112, and 114 to interface with one or more of the proprietary DRM systems 136, 138, and 140, including repositories of the proprietary DRM systems, programmatic interfaces 122, 124, and 126 of the proprietary DRM systems, and/or the DRM systems themselves. The programmatic interfaces 110, 112, 114, 122, 124, and 126 are logical functions. They can be implemented as part of the license repository and the proprietary DRM systems respectively or externally as separate glue modules. The shared digital license repository 142 can include one or more license management user interfaces 104 configured to manage the licenses, and further configured, as a part of the shared license repository 142, and/or as part of the proprietary DRM systems 136, 138, and 140.

The proprietary DRM systems 136, 138, and 140 can include DRM license repositories that are proprietary to the respective DRM systems, wherein the programmatic interface 122, 124, and 126, between instances of the shared digital license repository 142, are configured to enable license transfers therebetween. The proprietary DRM systems 136, 138, and 140 also can include license management user interfaces 116, 118, and 120 that are configured to manage the transfer of licenses between the instances of shared digital license repositories. The proprietary DRM systems 136, 138, and 140 can include the programmatic interfaces 122, 124, and 126, between service providers, and the shared digital license repository 142, configured to enable acquisition of licenses from the respective service providers, and configured for storage of the licenses on the shared digital license repository 142. The license management user interfaces 116, 118, and 120 also can be configured to manage the acquisitions of new licenses from service providers, and for storage of the licenses on the shared digital license repository 142.

The shared digital license repository 142 also can include an authentication component 144 configured to provide authentication of the shared digital repository 142 itself, and/or the user/owner of the shared digital license repository 142. The shared digital license repository 142 also can be configured as a repository for digital content. The exemplary system 100 need not include all of the components described with respect to FIG. 1, as further exemplary embodiments can include only some of the described components.

At the heart of the exemplary system is the digital license repository 142 that is capable of being shared among the multiple proprietary DRM systems 136, 138, and 140. The repository 142 can store, searches for, and understand licenses that are either expressed explicitly or implied by context (e.g., ownership of a CD implies a license to play the corresponding music). The licenses can be represented in a form unique to the repository 142. To facilitate access to licenses in the digital license repository 142 from any suitable location or device, the repository 142 can be configured as a mobile physical device that a user can carry, a device tethered to a network or tethered to a domain controlling device, such as a PC, set-top box, and game console, a software application running on a standard platform, a service accessible from various locations, and the like.

The shared digital license repository 142 enables multiple agents to participate in the lifecycle of licenses, wherein the multiple agents, advantageously, need not understand the proprietary expression of such licenses. The shared digital license repository 142 interfaces 110, 112, and 114 can be configured for license search, license acquisition, peer-to-peer license transfer, license renewal, conversion of licenses between proprietary DRM system formats, and the like.

To interact with users, the shared digital license repository 142 provides the license management user interface 104 that enables a user to interpret the contents of the repository 142, and perform lifecycle functions on the licenses stored in the repository 142, such as backing up, acquiring new licenses, transferring licenses, searching for licenses, reporting state, status and inventory of licenses, renewing licenses, scavenging obsolete licenses, issuing licenses, converting licenses to standard format, converting licenses between proprietary formats, archiving licenses to paper or other digital form, and the like.

To interact with the proprietary DRM systems 136, 138, and 140, the shared digital license repository 142 provides the programmatic interfaces 110, 112, and 114 that enable the storage, searching, retrieval and other license lifecycle funtions that include rights expressions unique to the particular DRM system 136, 138, and 140. The interfaces 110, 112, and 114 enable interoperability among the DRM systems 136, 138, and 140, advantageously, without requiring that the DRM systems 136, 138, and 140 understand each other's proprietary rights expressions. The shared digital license repository 142 also can be configured to provide a proof of identity feature, for example, via the authentication component 144 that enables the proprietary DRM systems 136, 138, and 140 to authenticate users.

The shared digital license repository 142 can interact with other digital license repositories 142. Each of the shared digital license repositories 142 can be configured to provide standardized interfaces (e.g., physical, programmatic, wireless or multiple, and the like) that enable the shared digital license repositories 142 to exchange licenses. The ability to interact with other shared license repositories 142 enables users to select a repository based on their preferred experience for acting upon licenses or to transfer licenses between repositories. One or more shared digital license repositories 142 can be implemented within a single computing entity. For example, a license repository service may provide the shared digital license repository service to multiple users.

The shared license repository 142 also can employ a proprietary interface offered by a particular DRM system to interact with the particular DRM system. This enables the shared license repository 142 to interoperate with DRM systems that do not support the native programmatic interfaces 110, 112, and 114 provided by the shared digital license repository 142.

Figure 2:
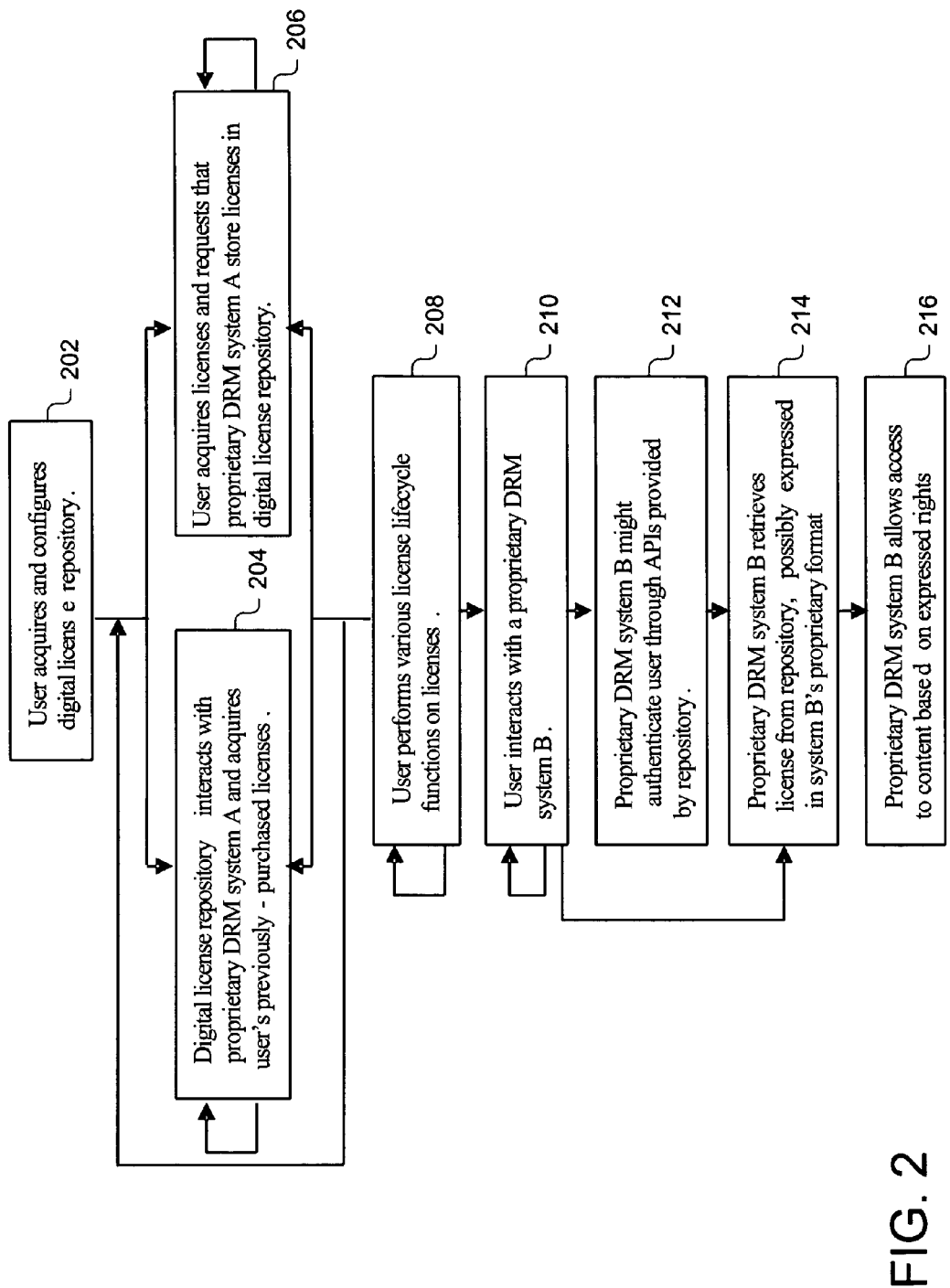
FIG. 2 provides an overview of an exemplary process for using a shared digital license repository of FIG. 1.

FIG. 2 provides an outline of exemplary steps for using the shared license repository 142, wherein in step 202 a user acquires, and configures the shared digital license repository 142. The exemplary embodiments enable users to select a repository from a third party, unlike traditional DRM systems that are confined to proprietary repositories. The shared digital license repository 142 can be a device, such as a handheld device that the user purchases, a software application running on a standard platform, a widely-available service, such as a web service or a service available to cellular phones, and the like. Since different implementations of the shared digital license repository 142 can offer different user interfaces, each user can choose among available shared digital license repository 142 offerings, for example, based on the user preferences, and the like. Then, the user can use the chosen shared digital license repository 142 to manage all their licenses, regardless of the DRM system that created the licenses.

In steps 204-206, the shared digital license repository 142 can be preloaded with a collection of licenses, or can interact with other digital license repositories 142 or various proprietary DRM systems 136, 138, and 140 to obtain the user's previously-acquired licenses. The user can actively or passively acquire licenses, as part of another activity, such as purchasing content or a rendering program, and the like. The shared digital license repository 142 can use the proprietary interface 122, 124, and 126 for each of the DRM systems 136, 138, and 140 to interact with the DRM systems 136, 138, and 140. The shared digital license repository 142 can store copies of all the user's previously-purchased licenses. The shared digital license repository 142 can be configured to copy the user's licenses from each of the DRM systems 136, 138, and 140 (e.g., via a pull process) or the DRM systems 136, 138, and 140 can be configured to copy the user's licenses to the shared license repository 142 (e.g., via a push process). Licenses can be explicitly expressed or implied from the consuming DRM system context (e.g., ownership of a DVD can imply a license to play the video encoded thereon).

The shared digital license repository 142 can enable content uses (e.g., rendering, consumption, copying, and distribution), using any suitable DRM system, by providing the necessary licenses in the proprietary format for the consuming DRM system. To use content, the appropriate license can be provided from the shared license repository 142 of the user to the consuming DRM system. The shared digital license repository 142 also can be used to authenticate the user consuming the content, for example, via the authentication component 144. Depending on the shared digital license repository 142 implementation, authentication can include use of cryptographic keys, biometric mechanisms, and the like.

In steps 208-216, the shared digital license repository 142 can provide the user with a consolidated license user interface that provides many capabilities to use and manage licenses throughout the lifecycles of the licenses. The user can choose among available repositories, based on the user's preferences, and can manage the licenses independently from the various DRM systems that originally created the licenses. The exemplary embodiments permit the shared license repository 142 to implement a rich set of lifecycle capabilities, including license transfer (e.g., peer-to-peer), renewal, search, acquisition, conversion from DRM to DRM, and the like.

In further exemplary embodiments, trust mechanisms, such as digital signatures, and the like, provided by the originating DRM system, can be preserved when licenses are stored in the shared digital license repository 142. If the proof of the license's authenticity cannot be extracted from the originating DRM system or provided to the consuming DRM system, the shared license repository 142 can be used to attest to the license's authenticity.

The exemplary embodiments provide many advantages over conventional DRM systems. For example, with respect to consistency in the user experience, the exemplary embodiments allow consumers to perform license management operations using a single user interface. Accordingly, in the exemplary embodiments, the shared license repository 142 can include the license management user interface 104 that the user can use to manage licenses, regardless of where the licenses are stored, the entities (e.g., DRM system, content owners, and content distributors) that created the licenses, or the DRM system used to exercise the corresponding licensed rights. The license management user interface 104 can interact with the proprietary DRM license repositories 136, 138, and 140 on behalf of the user. Advantageously, the user need not directly interact with the various DRM systems 136, 138, and 140 from which the licenses originated.

Using the license management user interface 104, the user can view information about all previously-acquired licenses, including information about the DRM systems to which such licenses apply. By employing the license management user interface 104, the user also can use the shared license repository 142 to acquire additional licenses or renew expired licenses from any suitable DRM system. The acquired licenses can be delivered directly to the shared license repository 142 for storage. The user also can perform peer-to-peer transfers of licenses to other users via the license management user interface 104. In a transfer, the original user's license can be expired, revoked, or destroyed, and a new license can be created for another user on the shared digital license repository 142 of the other user. With the license management user interface 104, the user also can create archival copies of licenses stored in the shared digital license repository 142 to be restored in the event of a DRM system failure, software/hardware move or upgrade, or change of authentication information such as email account and password.

Figure 3:
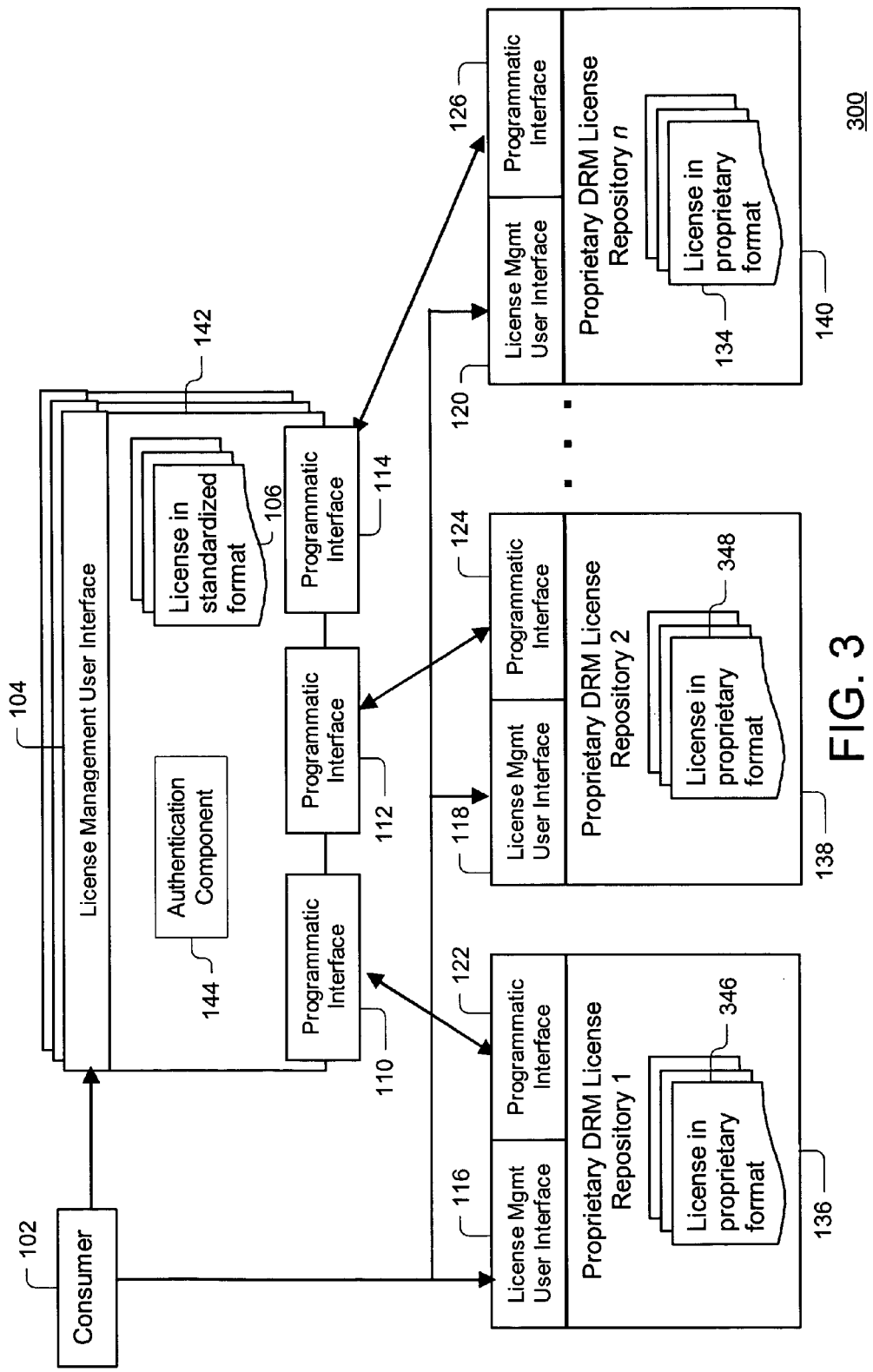
FIG. 3 illustrates an exemplary system for describing a shared license repository that provides a basic level of interoperability among proprietary DRM systems.

FIG. 3 illustrates an exemplary system 300, including the shared license repository 142 that provides a basic level of interoperability among proprietary DRM systems 136, 138, and 140. The exemplary system 300 of FIG. 3 operates in a similar manner as the exemplary system 100 of FIG. 1 with respect to the common components.

Figure 4:
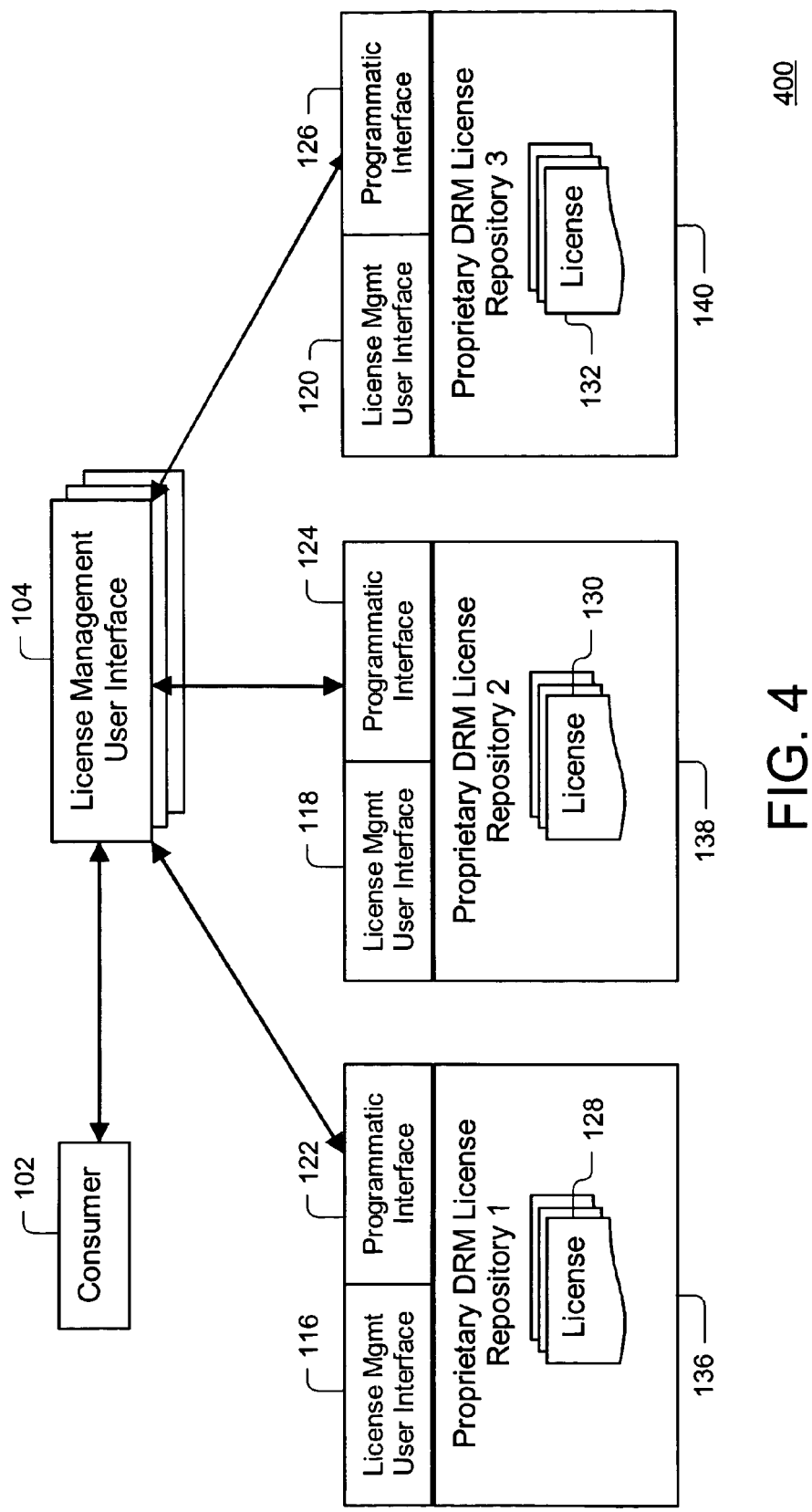
FIG. 4 illustrates an exemplary system including only some of the components illustrated in FIG. 1.

FIG. 4 illustrates a further exemplary system 400 that omits the shared license repository 142 component, and instead employs the shared license management user interface 104 to provide a virtual shared repository for combining licenses stored in the proprietary DRM systems 136, 138, and 140. In FIG. 4, the shared license management user interface 104 can be configured to provide a view of all the user's licenses stored in the proprietary DRM repositories 136, 138, and 140. To perform management operations, the user interacts with the shared license management user interface 104, which uses the programmatic interfaces 122, 124, and 126, provided by the proprietary DRM repositories 136, 138, and 140, to effect user requests. Otherwise, the exemplary system 400 of FIG. 4 operates in a similar manner as the exemplary systems 100 and 300 of FIGS. 1 and 3, respectively, with respect to the common components.

The exemplary embodiments provide a consolidated license inventory. For example, the exemplary embodiments allow consumers to purchase content from a variety of sources (e.g., brick and mortar stores, satellite/cable, internet download, and the like) in a variety formats (e.g., DVD, Redbook audio, computer DVD, streaming, and the like), for a variety of devices (e.g., PCs, set top boxes, car stereos, devices networked to remote locations, and the like). The exemplary embodiments also allow consumers to access content in accordance with the corresponding licenses, regardless of the licenses locations, the consumption device, or the DRM system that originally created the licenses. Thus, the exemplary embodiments allow for all content to be available for any suitable device capable of rendering the content, within the usage rules stipulated by the corresponding licenses for the content.

Accordingly, the shared digital license repository 142 can store copies of all previously-acquired licenses of a user, providing a consolidated inventory of the licenses. The shared digital license repository 142 can copy the user's licenses from each of the DRM systems 136, 138, and 140 (e.g., via a pull process) or the DRM systems 136, 138, and 140 can copy the user's licenses to the shared license repository 142 (e.g., via a push process). The shared digital license repository 142 can use the proprietary programmatic interface 122, 124, and 126 for each of the DRM systems 136, 138, and 140 to interact with the DRM systems 136, 138, and 140. The shared digital license repository 142 can be preloaded with a collection of licenses, such as all HBO or NFL programs, when the repository 142 is acquired. A service or a software program can be employed to aggregate user's previously-acquired licenses, and load the licensees into the shared digital license repository 142. Thus, the exemplary embodiments provide exemplary means to achieve license consolidation, but other equivalent means can be employed in further exemplary embodiments.

The exemplary embodiments provide user choices for shared digital license repositories, and DRM systems. For example, any suitable number of parties can offer shared digital license repository 142 implementations. The user can make a preference-based selection of the shared digital license repository 142 to use. The various implementers can differentiate their shared license repository 142 offerings according to factors, such as the storage of and access to licenses (e.g., portable device with a hardware interface, widely-available web service, and the like).

Further factors can include the characteristics of the license management interfaces 104 offered. For example, the license management interface 104 that the shared digital license repository 142 provides can present a consolidated view of each user's licenses, regardless of the DRM system that created the licenses or the proprietary license repository on which the licenses are stored.

Further factors can include the set of proprietary DRM systems supported. Accordingly, each shared digital license repository 142 can provide interoperability with an identified set of proprietary DRM license repositories. For example, implementer A might provide a shared license repository 142 as a web service that interoperates with proprietary DRM systems A, B, and C. Implementer A's shared license repository 142 can maintain copies of all the licenses that a particular consumer acquired from proprietary DRM systems A, B, and C. On the other hand, another implementer, B, can confine interoperability to DRM systems A and B, but not C.

Further factors can include price, wherein DRM vendors can offer their own proprietary user interface 104 that interoperates with the shared digital license repository 142. The various DRM vendors can differentiate their offerings according to factors, such as the device that the consumer uses to interact with the shared digital license repository 142 (such as personal computer, PDA, cellular phone, and the like), the presentation of the user interface (e.g., graphical or text based), the capabilities of the interface (e.g., simplified or full-featured), the supported set of shared digital license repositories, price, and the like. Advantageously, users can make preference-based selections of the user interface 104 to use, and still store all their licenses in a central, shared license repository 142.

The exemplary embodiments can use the shared digital license repository 142 to authenticate users. For example, when the consumer wants to use licensed content, the shared digital license repository 142 can optionally authenticate the user, for example, via the authentication component 144. Depending on the shared digital license repository 142 implementation, such authentication can include use of cryptographic keys, biometric mechanisms, and the like. An authentication license, for example, in the form of an X.509 digital certificate or an ISO MPEG REL license with a possessProperty grant, and the like, can be provided to the consuming DRM system in the following ways.

In an exemplary embodiment, the shared license repository 142 can provide the necessary license to the consuming DRM system in the proprietary format of the DRM system. For example, if the shared license repository 142 is available as a web service, and the consumer is using a PDA to consume content, the shared digital license repository 142 can provide the authentication license in the appropriate proprietary format to the DRM system residing on the PDA.

In a further exemplary embodiment, the consumer can copy the appropriate license from the shared digital license repository 142 to the consuming DRM system. For example, if the shared digital license repository 142 is available as a portable device, and the consumer is using a personal computer to consume the content, the consumer can copy the license in the appropriate proprietary format to the DRM system residing on the personal computer.

In a still further exemplary embodiment, if the shared digital license repository 142 is instantiated in the form of a smart card, the shared digital license repository 142 can be used by plugging the smart card into a host device, such as a PC, set-top box, game console, and the like. In this case, the authentication licenses, and usage licenses can be made available to the host device to enable access, and use of the content.

The exemplary embodiments can be used for independent verification of content acquisitions. For example, trust mechanisms, such as digital signatures, and the like, provided by the originating DRM system, can be preserved when licenses are stored in the shared license repository 142. If the proof of the license's authenticity cannot be extracted from the originating DRM system or provided to the consuming DRM system, the shared digital license repository 142 can be configured to attest to the license's authenticity.

In this way, the shared digital license repository 142 can provide independent verification of content acquisitions. In this role, the shared digital license repository 142 acts an independent agent that determines whether, when, how, and where a license was previously acquired. DRM systems, other than the originating DRM system, may honor such a license based on trust in the shared digital license repository 142 attesting to the existence and trustworthiness of the license. In addition, the shared digital license repository 142 enables consumers to prove such license acquisitions, if the licenses stored in the repository 142 need later to be reissued by the DRM system that originally created the licenses.

The exemplary embodiments can be used for exchange of licenses among interoperable repositories 142. For example, the exemplary embodiments allow consumers to access content in accordance with the corresponding licenses, regardless of the location of the licenses or the consumption device. Since any suitable number of parties can offer interoperable repositories 142, and license management interfaces to such repositories, each consumer can make a preference-based selection of one or more interoperable repositories to use.

To enable consumers to access content from any suitable location or using any suitable consumption device, the exemplary embodiments include interoperable repositories 142 that are able to exchange licenses. For example, assuming a consumer uses two interoperable repositories 142, one on a portable video player, and one available as a web service, and if the consumer has a license to play a particular movie on the portable video player, the exemplary embodiments allow the consumer to be able to transfer the license to the web service, and play the movie on a personal computer. Similarly, if a consumer uses a shared digital license repository 142 on a handheld device, and purchases a new handheld device, the exemplary embodiments allow the consumer to be able to transfer all the licenses from the old device to the new device. To provide such functionality, each shared digital license repository 142 can be configured to provide a standardized interface (e.g., physical, programmatic, or both) that enables the repository 142 to exchange licenses with other interoperable repositories 142.

Thus, the exemplary embodiments provide interoperability, and since heterogeneity in the DRM marketplace will exist for years to come, the exemplary embodiments offer ways to facilitate concurrent deployment of such incompatible DRM systems, while still making consuming DRM-protected content an acceptable consumer experience. By offering such level of interoperability, the exemplary embodiments are able to offer a consistent user interface to disparate DRM systems. Advantageously, the exemplary embodiments provide mobile access to digital licenses, regardless of the proprietary nature of the DRM system that created the licenses.

The exemplary embodiments can include a dedicated handheld license repository 142. For example, a user can purchase a portable license repository device 142, configured according to the exemplary embodiments, from a department store. The user can choose to purchase the device 142 based on various features that differentiate the device from the competing devices offered by various manufacturers, such as the form factor, ergonomics of the device, the user interface, the perceived robustness and reliability, better or broader support for proprietary DRM APIs, availability, connectivity, peer-to-peer service compatibility, price, and the like. For example, the user can purchase the portable license repository 142, configured according to the exemplary embodiments, that supports USB, wireless service connectivity, that can work with and store licenses for any suitable type of content, that can interoperate with Adobe, Microsoft, and Adelphia DRM systems, and that can be connected to Microsoft Windows or MAC OS computers, a cellular phone, a set-top box, or a portable MP3 player. Such a device can be configured as a dedicated device or the license repository 142 can be a feature of such a device that also includes other functions.

In this scenario, the user arrives home and can use the USB or wireless connectivity to attach the dedicated handheld license repository device 142 to, for example, Adobe, Microsoft, and Adelphia proprietary DRM systems on his personal computer running Microsoft Windows or some other software. The repository device 142 can authenticate the user using biometric information (e.g., fingerprints) or the repository device itself can be the user's authentication (e.g., in the case of a smart card). The device 142 can interact with each of the proprietary DRM systems 136, 138, and 140 using the corresponding proprietary interfaces 122, 124, and 126 thereof, extract the user's inventory of purchased licenses from each of the proprietary DRM systems 136, 138, and 140, and store copies of the extracted licenses. The user can use a screen of the device 142 to view the inventory of purchased licenses, including information about the content, and the DRM systems 136, 138, and 140 to which the respective licenses apply.

Periodically, the user can back up the licenses stored on the device 142 onto a computer. Advantageously, if the portable repository device 142 is ever broken, lost, stolen, or superseded by a "new and improved" device 142, the user will not lose all of the previously-acquired licenses, as the user can transfer the backup copies of the licenses to a replacement device.

If the user travels to a friend's house, and downloads a piece of digital content from the internet onto his friend's Apple MAC computer, the user can connect his license repository device 142 to his friend's computer, and make his license available for the content into his friend's Apple DRM system. Advantageously, the user then can consume the downloaded content on his friend's computer using his own license, and the Apple DRM system installed on his friend's computer.

The exemplary embodiments can include the shared license repository 142 configured as a service. For example, a user can subscribe to a web-based service that offers the shared license repository 142. The user can access the shared license repository 142 service from any suitable device that has connectivity, regardless of the type of physical connection (e.g., DSL, cable modem service, wireless access, or satellite access). The user can choose the shared license repository 142 web service based on various features that differentiate competing services, such as perceived robustness and reliability, better or broader support for proprietary DRM APIs, service functions such as backup and reporting, availability, connectivity, peer-to-peer service compatibility, price, and the like. For example, the user can subscribe to a shared license repository 142 service, which can work with and store licenses for any suitable type of content, and interoperate with Adobe, Microsoft, and Adelphia DRM systems.

From his home, the user can connect to the shared license repository 142 service using his DSL internet connection, and provide a user name and password as authentication information. The user can request that the shared license repository 142 service interact with the Adobe, Microsoft, and Adelphia proprietary DRM systems 136, 138, and 140 to obtain the user's licenses from each of the systems 136, 138, and 140. The shared license repository 142 service can interact with each of the systems 136, 138, and 140 using the proprietary interfaces 122, 124 and 126 thereof, extract the user's inventory of acquired licenses from each of the systems 136, 138, and 140, and store copies of the licenses. The user can use a web page of the shared license repository 142 service to view his inventory of acquired licenses, including information about the DRM system to which the licenses apply.

If the user travels to a friend's house, and downloads a piece of electronic content from the internet onto his friend's computer, the user can use his friend's computer, and cable modem to connect to the shared license repository 142 service, and copy his license for the content into his friend's Microsoft DRM system. The user then can consume the downloaded content on his friend's computer, using his own license, and the Microsoft DRM system installed on his friend's computer.

The exemplary embodiments can include the shared digital license repository 142 configured as a non-dedicated handheld device. In an exemplary embodiment, a handheld repository device 142 that is not dedicated can be integral to a device with another function, such as a cellular phone, a PDA, a portable game station, a portable video player, or an MP3 player. For example, a user can purchase a PDA that includes a shared license repository 142. The user can store licenses on the PDA for content protected with any suitable proprietary DRM system. The user can consume such protected content using the PDA device, or can connect the PDA device to another consumption device, such as a PC, and the like. In either case, the shared license repository 142 on the PDA can interoperate with the proprietary DRM system 136, 138, and 140 used to protect the content.

In this scenario, communication between the proprietary DRM systems 136, 138, and 140 and the shared license repository 142 can take place using the standardized interfaces 110, 112, and 114 of the shared license repository 142, if the DRM systems 136, 138, and 140 support such interfaces. If this is not possible, communication between the proprietary DRM systems 136, 138, and 140 and the shared license repository 142 can take place using the proprietary interfaces 122, 124, and 126 of the proprietary DRM systems 136, 138, and 140.

The exemplary embodiments can include the repository 142 interoperating with the DRM systems using proprietary interfaces. For example, a user subscribes to a web-based service that offers a shared license repository 142 that can work with and store licenses for any suitable type of content, and interoperate with Adobe, Microsoft, and Adelphia DRM systems 136, 138, and 140.

In this scenario, the user can use a computer to view an Adobe PDF file for which the user has a license stored in the shared license repository 142 web service. When Adobe Reader cannot locate a license for the PDF file in the Adobe proprietary license repository, Adobe Reader can prompt the user for the license location. The user can provide the shared license repository 142 web service URL, and the Adobe DRM system then can use a proprietary interface thereof to interact with the shared license repository 142 web service, and obtain the appropriate license. In effect the repository 142 would behave as a repository that Adobe Reader already understands instead of a new standardized repository. The Adobe DRM system then can check the provided license to determine whether stipulated usage rules are met, and if so, Adobe Reader can render the PDF file.

The exemplary embodiments can include the repository 142 interoperating with the DRM systems using a standard interface. For example, a user can purchase a dedicated portable repository device 142 that supports USB and wireless service connectivity. The device 142 can provide a standard programmatic interface that can interoperate with any suitable DRM system that supports such an interface, and can store licenses for any suitable type of content.

In this scenario, the user arrives home and attaches the dedicated portable repository 142 to Microsoft, Adobe, and Apple DRM systems 136, 138, and 140, all of which support the standard interface of the repository 142. The dedicated portable repository 142 can interact with each of the DRM systems 136, 138, and 140 using such standard interface, extract the user's inventory of acquired licenses from each of the systems 136, 138, and 140, and store copies of the licenses.

The user can travel to a friend's house, and download a video clip, for which the user has a license, from the internet onto a friend's computer. The user then can try to play the video clip using Windows Media Player, but when Windows Media Player cannot locate a license for the video clip on the friend's computer, Windows Media Player can prompt the user for the license location. The user can connect the dedicated portable repository 142 to the friend's computer, and specify the dedicated portable repository 142 as the license location. The Microsoft DRM system on the friend's computer then can use the standard interface of the dedicated portable repository 142 to interact with the repository 142, and obtain the appropriate license. In this case the Microsoft DRM system would have been modified to support a new repository interface that is explicitly intended to allow consumers to have a shared license repository 142. The Microsoft DRM system can check the provided license to determine whether stipulated usage rules are met, and if so, Windows Media Player can render the video clip.

The exemplary embodiments can include licenses that originate for the shared license repository 142. For example, a user can use a dedicated handheld repository device 142 to acquire, and store licenses, for any suitable type of content protected by a variety of proprietary DRM systems 136, 138, and 140. When the user wants to acquire a license for new content, the user can use the interface provided by the dedicated portable repository device 142.

For example, suppose the user has connected the dedicated portable repository device 142 to a portable MP3 player, and then wants to purchase a music file. Using the interface of the dedicated portable repository device 142, and a wireless internet connection, the user can search for the music the user wants to purchase. The search interface of the dedicated portable repository device 142 can return all matching music files associated with licenses that are in either the standardized format of the device 142 or in proprietary formats for the DRM systems 136, 138, and 140 with which the dedicated handheld repository device 142 can interoperate. The user can select the license the user wants to acquire (e.g., the license that costs the least). The dedicated portable repository device 142 can obtain the selected license, and the music file can be downloaded to the MP3 player of the user. When the user plays the music file, the dedicated portable repository device 142 can provide the license to the proprietary DRM system used to protect the music file.

The exemplary embodiments can include peer-to-peer communication among dedicated portable repositories. In this scenario, two users, Jack and Nancy, can purchase dedicated portable repository devices 142, and store licenses on the devices 142 for many types of content protected by a variety of proprietary DRM systems 136, 138, and 140. Although not necessarily from the same manufacturer, both devices 142 can support the same standardized interface, so that the devices 142 can communicate with each other to perform various peer-to-peer activities, including license transfers and loans (e.g., temporary transfers), and the like.

For example, if Jack wants to transfer his license for an e-Book to Nancy's device 142, Jack can connect his device 142 to Nancy's device 142, and use the user interface on his device 142 to transfer the license. The original license on Jack's dedicated portable repository device 142 can be revoked, and a new, identical, license can created on Nancy's dedicated portable repository device 142. This scenario would be practical for licenses granting usage rights to a group of people, such as members of a book club, and the like, to which both Jack and Nancy belong. The proprietary DRM system that created, and consumes the transferred license can authorize the dedicated portable repository devices 142 to perform this type of license revocation, and creation. Therefore, when Nancy tries to use the new license, the proprietary DRM system trusts her license, and allows her to read the e-Book.

In a similar example, Jack can transfer his license for the e-Book to Nancy's device 142, and the original license on Jack's dedicated portable repository device 142 can be marked as expired. A new, similar, license can be created on Nancy's dedicated portable repository device 142. The new license can grant the same usage rights, but can name Nancy as the person to whom such rights are granted. Once again, the proprietary DRM system that created, and consumes the transferred license can authorize the dedicated portable repository devices 142 to perform this type of license revocation and creation. Therefore, when Nancy tries to use the new license, the proprietary DRM system trusts her license, and allows her to read the e-Book.

In a further exemplary embodiment, Jack can lend (e.g., temporarily transfer) his license to Nancy. In this case, Jack's license can be disabled during the period of the loan, and Nancy's license can only be valid for the period of the loan. When the loan ends, Jack's license can be re-activated, and Nancy's license can expire. Once again, the proprietary DRM system that creates, and consumes the licenses can authorize the dedicated portable repository devices 142 to perform this type of license expiration, and creation.

In another exemplary embodiment, the dedicated portable repository devices 142 can communicate with a proprietary DRM system when performing peer-to-peer activities. In this case, when Jack transfers his license to Nancy's device 142, Jack's dedicated portable repository device 142 can request that the proprietary DRM system mark Jack's license as expired, and create a new license on Nancy's device 142. Such requests can be made over the standardized interface of the dedicated portable repository device 142, if the proprietary DRM system supports such interface. Otherwise, the dedicated portable repository device 142 can use the proprietary interface of the DRM system to make such requests.

In yet another exemplary embodiment, a transfer of a license can involve a financial transaction, and a third-party, such as an escrow or auction service. For example, Jack can auction licenses for rights to play several audio files, similar to selling a used CD collection. Nancy can bid on the licenses, and then win the auction. Using the standardized interface offered by the dedicated portable repository device 142, Jack can transfer the licenses to an escrow account. Nancy can place her payment in the escrow account. The escrow service can affect the transaction, transferring the payment to Jack, and transferring the licenses to Nancy's dedicated portable repository device 142, using a standardized interface thereof.

The exemplary embodiments can include the shared digital license repository 142 configured to provides license storage. In this exemplary embodiment, the shared digital license repository 142 can be used as a license storage service, without using or even having the license management user interface component 104. For example, a user can have a dedicated portable repository device 142 that can be used to store all licenses for the user. To perform any suitable license management functions, the user can use the proprietary user interfaces provided by the DRM systems 136, 138, and 140 that created, and consume the licenses.

Whenever the user consumes content using a license stored in the dedicated portable repository device 142, the proprietary DRM systems 136, 138, and 140 can communicate with the device 142 in various ways. For example, the DRM systems 136, 138, and 140 can look for the appropriate license on the dedicated portable repository device 142, and communicates with the device 142 using the standardized interface thereof. The DRM systems 136, 138, and 140 also can look for the appropriate license on the dedicated portable repository device 142, and communicate with the device 142 using the proprietary interfaces of the DRM systems 136, 138, and 140. The DRM systems 136, 138, and 140 also can look for the appropriate license in a proprietary license store of the DRM systems 136, 138, and 140. The dedicated portable repository device 142 can be used to replace such a license store, and a transaction can be conducted with the licenses of the portable repository device 142. Accordingly, to the proprietary DRM systems 136, 138, and 140, the dedicated portable repository device 142 can look like the proprietary license store of the DRM systems 136, 138, and 140.

The exemplary embodiments can include the shared digital license repository 142 configured to verify content acquisitions. For example, a user can use the shared digital license repository 142 to address obsolescence of content media or DRM systems 136, 138, and 140. The user can use the shared digital license repository 142 to verify a purchase of a license to particular content, and continue to access such content, even after the content media, which provided an implied license, or rendering device of the media has become obsolete.

For example, suppose a user subscribes to a shared license repository 142 web service that interoperates with the various proprietary DRM systems 136, 138, and 140. The shared license repository 142 web service also can interoperate with various online retailers of physical content media, such as Amazon.com. The user then can purchase a DVD for a movie from Amazon.com, wherein the purchase of the DVD implies a license to play the movie encoded on the DVD. The shared digital license repository 142 web service can store such implied license.

Over time, the DVD can become obsolete (e.g., the DVD is replaced by streaming video), but because the user already has purchased the movie on DVD, the exemplary embodiments allow the user to continue watching the movie in another format, even though the DVD copy of the user has become outmoded. In this scenario, if the vendor offering the streaming video is willing to honor the previously acquired licenses stored in the shared license repository 142 web service, the shared license repository 142 web service can attest that the user has already acquired a license for the movie in question. The shared license repository 142 web service then can provide all the details of the original license proof of purchase, including the vendor (e.g., Amazon.com), the media (e.g., DVD), the date of purchase, the purchase price, and the like. Since the streaming video vendor can trust the shared license repository 142 web service, the user can be allowed to view the corresponding movie on streaming video.

The exemplarily embodiments include devices that support multiple physical interfaces. For example, the shared digital license repository 142 can include multiple physical mechanisms for connecting to other repositories or the DRM systems with which the repository 142 interoperates, such as USB, Bluetooth, 1394, PCMCIA, 802.11 (a/b/g), proprietary, RFID, CDMA, GSM, and the like. Such connections can be operated in parallel, serial, and the like.

The exemplarily embodiments include devices that support a variety of DRM APIs for extracting licenses. For example, a single shared digital license repository 142 can be configured to interoperate with several different DRM systems to extract licenses therefrom. Such interoperation can be via proprietary APIs that each DRM system natively supports. For example, the repository 142 can be configured to act as a rendering application for the purpose of extracting licenses when communicating with Adobe Acrobat. The repository 142 can query Adobe Acrobat about the permissible rights for a given piece of content, and record the results.

The exemplarily embodiments include devices that support a new standard API for accessing repositories of DRM systems. For example, a DRM vendor can offer direct support for digital license repositories 142, by supporting the standard APIs that explicitly enable each of the repositories 142 to query the DRM system to determine the available licenses. The DRM systems can be configured to employ user interfaces thereof to push licenses to the shared digital license repository 142 or the repository 142 can be configured to pull licenses from the DRM systems.

In an exemplary embodiment, a user can be using an instance of a DRM system, such as Windows Media Player, and while the DRM system is active, the DRM system can discover the shared repository 142, and offer to have the licenses that the DRM instance understands stored or copied into the repository 142.

The exemplarily embodiments include devices that support a mechanism for biometrically authenticating users of such devices. Accordingly, one complication in creating a DRM system is authenticating who or what can exercise the rights that have been expressed. Most conventional DRM systems bind usage of a given digital content instance to one specific instance of the DRM systems. For example, licenses typically are granted to a given device or PC. However, with exemplarily embodiments, the repository device 142 can offer an authentication service to DRM systems, such as a fingerprint reader, and the like. The DRM systems can query the repository 142 to check the fingerprint of the user of the device. In this way, licenses can be bound to the repository 142 or the fingerprint of the user connecting to multiple DRM systems, instead of being bound to an instance of a DRM system.

In an exemplary embodiment, the DRM systems can be configured to trust the repository device 142 to authenticate a user. This is similar to the exemplary biometric system described above, but rather employing a log-in ID and password arrangement, digital certificate, RFID, or other type of user authentication system, and the like, that need not be biometrically based. The DRM instance can bind the content to the authentication mechanism of the repository 142. Users can choose repositories 142 that support a form of authentication with which the users are comfortable. In a further exemplary embodiment, a cell phone can be configured as the repository 142 to provide all the repository 142 functionality coupled with authentication via native identification capabilities of the cell phone.

In a still further exemplary embodiment, the shared digital license repository 142 can be configured as a unique key, and the DRM systems can be configured to trust the presence of the unique key as the authorization for licenses. For example, a DRM system can be configured to check for accessibility to a uniquely-identified repository 142, and if the repository 142 is accessible, rights for the associated content can be exercised. Advantageously, this exemplary embodiment enables mobility of licenses, wherein rights to content move as the repositories 142 move.

The exemplarily embodiments include the repository 142 not configured as a physical device, but rather configured as a connected service (e.g., cell phone service, Internet service, satellite service, and the like). Accordingly, the repository 142 need not be a physical device that the consumer owns, but rather can be configured as an Internet or mobile phone service, and the like. In such cases, the user can connect the repository 142 to an instance of a DRM system. Such connection can be built into the DRM system, if the DRM system natively supports the interface to the repository 142, or the connection can be made via a multifunction device, such a cell phone, and the like. For example, a user might have a Bluetooth-enabled CDMA phone that the user carries, and the user may encounter a Windows PC, and wish to exercise a stored license. The phone can be connected to the PC via Bluetooth, and then using the phone as an intermediate, the PC can be connected to the shared digital license repository 142 via CDMA. Then, the PC could find licenses for use in the CDMA-based repository 142.

The exemplarily embodiments include a user employing the digital license repository 142 to search online, and purchase new licenses. For example, the repository 142 can be configured to include its own user interface, and act as a store front for acquiring licenses from different services. In this case, a user can visit a friend's home, and use the repository 142 to search for content for viewing or listening. After the content is identified, a purchase can take place, and a new license can be delivered to the repository 142. Then, the local DRM system at the friend's home can be used to view or listen to the content.

The exemplarily embodiments include a user making an offsite archival copy of content of the shared digital license repository device 142, and restoring the content for the future, if the device 142 is lost, stolen, or broken. The shared digital license repository 142 or an offsite archival copy can be used for restoring the licenses of proprietary DRM systems 136, 138, and 140 if the licenses are lost, stolen, or broken. For example, the repository 142 can be configured to support an export mechanism that can be paper-based (e.g., glyphs or text for OCR), removable media-based (e.g., CDR or smart card), fixed media-based (e.g., a hard drive on a PC), service-based (e.g., Microsoft Passport), and the like. Advantageously, this enables users to retrieve their inventory of licenses, if the device 142 is lost, stolen, or broken. The import of licenses from the archive can be proprietary to a brand of repository 142 or interoperable to enable a consumer to change repositories 142.

In an exemplary peer-to-peer license transfer, a shared digital license repository 142 of a user A can attach to a repository of a user B, wherein one of the licenses of the user A expires, and a new license that user B can use is created. For example, two users can agree to transfer a license from one repository 142 to another. In essence, two people agree to exchange rights for a specific content instance. In this exemplary embodiment, a user connects the two repositories 142 together, and gives a license away or sells the license. The repositories 142 can include a mechanism to expire or to revoke a license that is given away or sold.

In an exemplary embodiment, the repository device 142 can be authorized to expire, and generate new licenses, and the DRM systems can be configured to trust the device 142 to perform such a function. For example, the repository 142 can be entrusted by a DRM system to expire or terminate licenses. In exemplary embodiments, the repository 142 can create a temporary license that can be exercised by the DRM system for a limited duration of time. In a disconnected system, the repository 142 can be trusted to generate limited licenses.

In an exemplary embodiment, the repository 142 can use standardized APIs to connect to the DRM systems that originally created licenses, to perform license expiration and re-issuance, to execute the peer-to-peer license transfer. For example, the repository 142 can be used to transfer a license from one DRM instance to another. Instead of two repositories 142 exchanging a license, this exemplary embodiment enables two DRM systems to transfer a license via the repository 142, and connections thereof. In this case, the right to transfer a license can be authorized, wherein the repository 142 acts as a conduit for the transfer.

In an exemplary embodiment, the repository 142 can use APIs proprietary to the DRM systems that originally created licenses, to perform the expiration, and issuance of licenses, to execute the peer-to-peer license transfer. For example, the repository 142 can act as a responsible agent, and perform a transfer between two instances of DRM systems, instead of the repository 142 using standardized APIs to facilitate a license transfer with the cooperation of the DRM system. This transfer may or may not be a feature of either DRM system.

In an exemplary embodiment, the repository 142 can be used to interpret rights. For example, the actual licenses can be stored in a DRM-neutral way, wherein the repository 142 interprets the rights instead of converting the license to a form that the DRM system can understand. The repository 142 can be enhanced with an appropriate API that enables the DRM system to transfer responsibility for interpreting the licenses to the repository 142.

In an exemplary embodiment, using standardized APIs, the repositories 142 can communicate with each other to perform various peer-to-peer activities. Accordingly, two or more repositories 142 can be connected to each other, so that license holders can form systems of license sharing and discovery. A peer-to-peer network of repositories 142 can be formed to facilitate license pooling, real-time/online auctioning, and the like. For example, a network of repositories 142 can be created, and can be used to transfer licenses in real-time. To join, a user, for example, must offer five licenses for sharing. Then, the user can search the repository 142 network, and identify a license the user wants to exercise. The license loan or transfer can be made to the repository 142 of the user in real time, and the DRM system can be notified to allow consumption. Thereafter, the license can be offered back to the repository 142 network. Advantageously, such an exemplary system can potentially allow an infinite number of users to access an infinite number of licenses "legally."

In an exemplary embodiment, the repository 142 can be configured as a service to the DRM systems, and the DRM systems can use their own user interfaces to perform license management functions using standardized APIs. For example, the repository 142 can offer itself as a way for the DRM systems to store, and retrieve licenses. The DRM systems can still own the management user interface for such licenses, wherein the DRM systems can be configured to support the APIs of the repository 142.

In an exemplary embodiment, the repository 142 can be configured as a service to the DRM systems, and the DRM systems can use their own user interfaces to perform license management functions using proprietary APIs. For example, the repository 142 can offers itself as a way for the DRM systems to store, and retrieve licenses. The DRM systems can still own the management user interface for such licenses, wherein the DRM systems are "tricked" into using the repository 142. In this exemplary embodiment, the repository 142 can be configured to intercept license store requests native to the DRM systems, and provide such functionality.

In an exemplary embodiment, the repository 142 can include its own user interface to perform license management functions across each of the DRM systems via standardized APIs. For example, the user interface of the repository 142 can be configured to enable the user to see the licenses stored in an instance of a DRM system, wherein the DRM system can be configured to allow the repository 142 to access the license store of the DRM system via standardized APIs.

In an exemplary embodiment, the repository 142 can include its own user interface to perform license management functions across each of the DRM systems via proprietary APIs. For example, the user interface of the repository 142 can be configured to enable the user to see the licenses stored in an instance of a DRM system, wherein the DRM system need not be modified, but rather the repository 142 is configured to uses the native APIs of the DRM system to determine the available licenses.

In an exemplary embodiment, using standardized APIs, the repositories 142 can connect to an escrow or auction service to enable two users to find each other, and perform secure, remote peer-to-peer license interactions. For example, a seller can connect their repository 142 to a service, such as eBay, and the like, and offer licenses for auction, wherein eBay buyers then can browse the seller's repository 142, and prices for the licenses that are stored therein. When an escrow service thereafter verifies that a payment has been made, the seller's repository 142 can be connected to a repository 142 of the buyer, and a license transfer can be executed.

In an exemplary embodiment, the repository 142 can be configured to offer other types of peer-to-peer license transfers. For example, other types of peer-to-peer transfers, such as license lending and resale, can be supported between repositories 142. The repositories 142 can transfer a license between each other, and agree to revoke and re-instate the loaned license, under appropriate conditions.

With the exemplary embodiments, businesses can compete for the opportunity to create the repository 142 for a consumer, by providing better user interfaces, robustness, better proprietary API support, ergonomics, availability, peer-to-peer service compatibility, better price, reliability, and the like. The form, capabilities, cost, and robustness of the repository 142 can be customized to find the right consumer. A good precedence for this model is the variety and capabilities of cell phones and service programs in the wireless industry.

The above-described devices and subsystems of the exemplary embodiments of FIGS. 1-4 can include, for example, any suitable servers, workstations, PCs, laptop computers, PDAs, Internet appliances, handheld devices, cellular telephones, wireless devices, portable players, other devices, and the like, capable of performing the processes of the exemplary embodiments of FIGS. 1-4. The devices and subsystems of the exemplary embodiments of FIGS. 1-4 can communicate with each other using any suitable protocol and can be implemented using one or more programmed computer systems or devices.

One or more interface mechanisms can be used with the exemplary embodiments of FIGS. 1-4, including, for example, Internet access, telecommunications in any suitable form (e.g., voice, modem, and the like), wireless communications media, and the like. For example, communications networks employed by the exemplary embodiments of FIGS. 1-4 can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the exemplary embodiments of FIGS. 1-4 are for exemplary purposes, as many variations of the specific hardware used to implement the exemplary embodiments are possible, as will be appreciated by those skilled in the relevant art(s). For example, the functionality of one or more of the devices and subsystems of the exemplary embodiments of FIGS. 1-4 can be implemented via one or more programmed computer systems or devices.

To implement such variations as well as other variations, a single computer system can be programmed to perform the special purpose functions of one or more of the devices and subsystems of the exemplary embodiments of FIGS. 1-4. On the other hand, two or more programmed computer systems or devices can be substituted for any one of the devices and subsystems of the exemplary embodiments of FIGS. 1-4. Accordingly, principles and advantages of distributed processing, such as redundancy, replication, and the like, also can be implemented, as desired, to increase the robustness and performance the devices and subsystems of the exemplary embodiments of FIGS. 1-4.

The devices and subsystems of the exemplary embodiments of FIGS. 1-4 can store information relating to various processes described herein. This information can be stored in one or more memories, such as a hard disk, optical disk, magneto-optical disk, RAM, and the like, of the devices and subsystems of the exemplary embodiments of FIGS. 1-4. One or more databases of the devices and subsystems of the exemplary embodiments of FIGS. 1-4 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-4 can include appropriate data structures for storing data collected and/or generated by the processes of the devices and subsystems of the exemplary embodiments of FIGS. 1-4 in one or more databases thereof.

All or a portion of the devices and subsystems of the exemplary embodiments of FIGS. 1-4 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments of FIGS. 1-4 can be implemented on the World Wide Web. In addition, the devices and subsystems of the exemplary embodiments of FIGS. 1-4 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1-4, for driving the devices and subsystems of the exemplary embodiments of FIGS. 1-4, for enabling the devices and subsystems of the exemplary embodiments of FIGS. 1-4 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the invention. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 1-4 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of exemplary embodiments and implementations, the present invention is not so limited but rather covers various modifications and equivalent arrangements, which fall within the purview of the appended claims.

What is claimed is:

1. A computer system for content use, said computer system including one or more processors and one or more memory devices, said computer system comprising:
   a shared license computer device comprising:
   a first set of at least one of said one or more processors and at least one of said one or more memory devices having instructions recorded thereon for managing licenses on behalf of a user wherein the user is associated with the shared license computer device,
   a license management user interface component configured to accept license lifecycle management commands from a user,
   a first API, and
   a second API;
   a first DRM computer system comprising:
   a second set of at least one of said one or more processors and at least one of said one or more memory devices having instructions recorded thereon for receiving a first instance of content, restricting use of the first instance of content in accordance with a first license defining a permitted use, and transmitting a first indication of the permitted use based on the first license to the first API, the second set of at least one of said one or more processors and memory devices being a different set than the first set of at least one of said one or more processors and memory devices;
   a second DRM computer system comprising:
   a third set of at least one of said one or more processors and at least one of said one or more memory devices having instructions recorded thereon for receiving a second indication of the permitted use, which is based on the first indication of permitted use, from the second API and restricting use of a second instance of the content in accordance with the second indication of the permitted use to thereby authorize a player of the second DRM computer system to provide use of the second instance of the content to the user, wherein the second instance of the content is not derived from the first instance of content and wherein the second DRM computer system utilizes an enforcement mechanism that is different than an enforcement mechanism of the first DRM computer system, the third set of at least one of said one or more processors and memory devices being a different set than the second set of at least one of said one or more processors and memory devices and the first set of at least one of said one or more processors and memory devices.

2. The system as recited in claim 1, wherein memory devices in said first set of at least one of said one or more processors and at least one of said one or more memory devices include instructions for authenticating the user before granting access to the shared computer device.

3. The system as recited in claim 1, wherein the first set of at least one of said one or more processors and at least one of said one or more memory devices comprises a Web server.

4. The system of claim 1, wherein the first set of at least one of said one or more processors and least one of said one or more memory devices comprises a network server.

5. The system of claim 1, further comprising a plurality of different first DRM computer systems, wherein the shared license computer device is configured to communicate with the different first DRM computer systems.

6. The system of claim 1, further comprising a plurality of different second DRM computer systems, wherein the shared license computer device is configured to communicate with the different second DRM computer systems.

7. The system of claim 1, wherein the content use includes content consumption.

8. The system of claim 1, wherein the license management user interface component is standardized or proprietary.

9. The system of claim 1, wherein the shared license computer device comprises a license extraction interface configured to create the first indication based on the first license.

10. The system of claim 1, wherein the license-lifecycle management commands are commands for manipulating a license associated with the content instead of a specific instance of the content.

11. The system of claim 10, wherein, based upon the the second indication of the permitted use, the second instance of the content is available to the user on the second DRM computer system, and the second instance of the content is usable on a content consumption environment of the second DRM computer system.

12. The system of claim 1, wherein the license management user interface component is configured to allow the user to access plural licenses of the user.

13. The system of claim 1, wherein the shared license computer device is configured to manage a plurality of DRM computer systems of the user in an aggregated view, including determining licenses owned by the user and determining where the licenses are stored.

14. The system of claim 1, wherein the shared license computer device is configured to allow the user to add a new license.

15. The system of claim 14, wherein the new license is added to a DRM computer system of the user which is associated with the shared license computer device.

16. The system of claim 15, wherein the shared license computer device adds the new license in a format compatible with the DRM computer system of the user.

17. The system of claim 1, wherein the license management user interface component is configured for allowing the user to browse the shared license computer device.

18. The system of claim 1, wherein the shared license computer device is configured to be pre-loaded with one or more indications of permitted uses.

19. The system of claim 1, wherein the shared license computer device is configured to store one or more indications of permitted uses associated with one or more pre-existing DRM computer systems, whereby if the corresponding pre-existing DRM computer systems, licenses, content, format or media are lost, damaged, or obsolete, the shared license computer device is configured to use the stored indications of permitted use to re-authorize content adapted to a current content consumption device, format, media, or DRM computer system.

20. The system of claim 1, wherein the shared license computer device is configured to be used in conjunction with an escrow service device that allows the user to exercise a principle of first sale.

21. The system of claim 20, wherein the shared license computer device is configured to submit a license of the user to the escrow service device and revoke the submitted license.

22. The system of claim 21, wherein the escrow service device issues a new license to another party, in response to receiving money or other consideration including another license from the another party, corresponding to the submitted license to thereby complete a sale or exchange transaction associated with the submitted license.

23. The system of claim 20, wherein the escrow service device allows users to trade licenses on demand.

24. The system of claim 23, wherein the escrow service device processes a plurality of licenses associated with corresponding content, allows users to borrow licenses as the corresponding content is used, and allows users to return licenses when the users are no longer using the corresponding content.

25. The system of claim 1, wherein the shared license computer device is configured to build content usage rules based on a DRM computer system of the user.

26. The system of claim 25, wherein the content usage rules are not based on a license physically stored in the DRM computer system of the user and are based on information about the shared license computer device of the DRM computer system and the content usage rules at a time that extraction of corresponding content occurs.

27. The system of claim 26, wherein the content usage rules are associated with a content consumption software or device, and which govern use of the corresponding content.

28. The system of claim 27, wherein the content usage rules change with an update or new version of the content consumption software or device.

29. The system of claim 28, wherein the shared license computer device has information relating to what the content usage rules are at a given time, and records the content usage rules in a DRM expression associated with the shared license computer device, whereby the user can document content usage rules being enforced during periods of time of usage of the corresponding content.

30. The system of claim 1, wherein the shared license computer device is configured to analyze one or more DRM computer systems of the user, and securely record licenses associated with the one or more DRM computer systems of the user.

31. The system of claim 30, wherein the shared license computer device is configured to securely record the licenses associated with the one or more DRM computer systems of the user in at least one of paper form, signed digital document, and offsite storage, including a server.

32. The system of claim 31, wherein the shared license computer device is configured to use the secure recording to acquire or reissue a lost license or create a new license based on a new DRM computer system of the user.

33. The system of claim 2, wherein the instructions for authenticating includes a license wallet including a biometric characteristic or secure digital certificate associated with the user.

34. The system of claim 2, wherein the instructions for authenticating includes biometric authentication of the user.

35. The system of claim 34, wherein the biometric authentication of the user includes thumb print verification of the user.

36. The system of claim 1, wherein the shared license computer device is configured to provide a DRM computer system of the user with a credential associated with the user to authenticate the user.

37. The system of claim 1, wherein the shared license computer device is configured to centrally authenticate one or more licenses issued to the user for one or more corresponding DRM computer systems of the user.

38. The system of claim 1, wherein the shared license computer device is configured as a license interpreter.

39. The system of claim 38, wherein the shared license computer device is configured to receive queries regarding content usage from one or more DRM computer systems of the user, and search for corresponding permitted uses and permit or deny the content usage based on search results.

40. The system of claim 39, wherein the shared license computer device is configured to handle license interpretation and management for the DRM computer system of the user.

41. The system of claim 1, wherein the user can be a human or a machine.

42. The system of claim 1, wherein the license management user interface component is configured to allow a user to extract or construct an indication of a permitted use from the first DRM computer system.

43. The system of claim 1, wherein the shared license computer device and the first DRM computer system are configured to support a license in a standardized or in a proprietary format.

44. The system of claim 1, wherein authentication information and content usage rules are included in a single license.

45. A computer-implemented method for content use, the method being implemented by one or more computing devices, the method comprising:
receiving, from a first DRM computer system and through a first API of a shared license computer device associated with a user, a first indication of a permitted use based on a first license, wherein the first DRM computer system is configured to receive a first instance of the content and restrict use of the first instance of the content based on the first license, wherein the first DRM computer system is external to the one or more computing devices;
sending, through a second API of the shared license computer device, a second indication of the permitted use to a second DRM computer system in response to selection by the user of a license-lifecycle management command displayed through a license management user interface component of the shared license computer device, wherein the second DRM computer system is configured to restrict use of a second instance of the content based on the permitted use and wherein the second instance of the content is not derived from the first instance of the content, wherein the second DRM computer system is external to the one or more computing devices and different from the first DRM computer system;
receiving the second indication of the permitted use by the second DRM computer system; and
associating the second indication of the permitted use with the second instance of the content available to the second DRM computer system wherein the second DRM computer system restricting is configured to restrict access to the second instance of the content based on the second indication of the permitted use.

46. The method as recited in claim 45, further comprising authenticating the user before granting access to the shared license computer device.

47. The method as recited in claim 45, wherein the shared computer device comprises a Web server.

48. The method of claim 45, wherein the shared license computer device comprises a network server.

49. The method of claim 45, wherein a plurality of different first DRM computer systems are provided, and the method includes further comprises the shared license computer device communicating with the different first DRM computer systems.

50. The method of claim 45, wherein a plurality of different second DRM computer system are provided, and the method further comprises the shared license computer device communicating with the second DRM computer systems.

51. The method of claim 45, wherein the content use or distribution includes content consumption.

52. The method of claim 45, wherein the shared license computer device comprises plural computer devices.

53. The method of claim 45, further comprising the shared license computer device extracting the second indication of permitted use from the first indication of permitted use.

54. The method of claim 45, wherein the first DRM computer system is not configured with support for the shared license computer device.

55. The method of claim 45, further comprising managing the content by managing a license associated with the content instead of a specific instance of the content.

56. The method of claim 45, further comprising the shared license computer device evaluating a plurality of DRM computer systems of the user in an aggregated view, including determining licenses owned by the user, and determining where the licenses are stored.

57. The method of claim 45, further comprising the shared license computer device allowing the user to add a new license.

58. The method of claim 57, further comprising adding the new license to a DRM computer system of the user, and associating the added license with the shared license computer device.

59. The method of claim 58, further comprising the shared license computer device adding the new license in a format compatible with the DRM computer system of the user.

60. The method of claim 45, further comprising allowing the user to browse the shared license computer device.

61. The method of claim 45, further comprising providing the shared license computer device pre-loaded with one or more licenses.

62. The method of claim 45, further comprising the shared license computer device storing one or more licenses associated with one or more pre-existing DRM computer systems, whereby if the corresponding pre-existing DRM computer system, licenses, content, format or media are lost, damaged, or obsolete, the method further comprises the shared license computer device using the stored licenses to re-authorize content adapted to a current content consumption device, format, media, or DRM computer system.

63. The method of claim 45, further comprising using the shared license computing device in conjunction with an escrow service device, and the escrow service device allowing the user to exercise a principle of first sale.

64. The method of claim 63, further comprising the shared license computing device submitting a license of the user to the escrow service device, and the shared license computer device revoking the submitted license.

65. The method of claim 64, wherein another party submits money or other consideration, including another license to the escrow service device, and the method further comprises the escrow service device issuing a new license corresponding to the submitted license to the party to complete a sale or exchange transaction associated with the submitted license.

66. The method of claim 63, further comprising the escrow service device allowing users to trade licenses on demand.

67. The method of claim 66, further comprising the escrow service device allowing, users to borrow licenses as the corresponding content is used, and return licenses when the users are no longer using the corresponding content.

68. The method of claim 45, further comprising the shared license computing device building content usage rules based on a DRM computer system of the user.

69. The method of claim 68, wherein the content usage rules are not based on a license physically stored in the DRM computer system of the user, but instead are based on information relating to the shared license computing device of the DRM computer system and the content usage rules at a time that extraction of corresponding content occurs.

70. The method of claim 69, further comprising associating the content usage rules with a content consumption software or device, and the content usage rules governing use of the corresponding content.

71. The method of claim 70, further comprising changing the content usage rules with an update or new version of the content consumption software or device.

72. The method of claim 71, further comprising via the shared license computer device, providing information relating to what the content usage rules are at a given time, and the shared license computer device recording the content usage rules in a DRM expression associated with the shared license computing device, whereby the user can document content usage rules being enforced during periods of time of usage of the corresponding content.

73. The method of claim 45, further comprising the shared license computer device analyzing one or more DRM computer system of the user, and the shared license computer device securely recording licenses associated with the DRM computer system of the user.

74. The method of claim 73, further comprising the shared license computer device recording the licenses associated with the DRM computer system in at least one of paper form, as a signed digital document, and offsite storage, including a server.

75. The method of claim 74, further comprising the shared license computer device using the secure recording to acquire or reissue a lost license or create a new license based on a new DRM computer system of the user.

76. The method of claim 45, further comprising providing a DRM computer system of the user with a credential associated with the user to authenticate the user by the shared license computer device.

77. The method of claim 45, further comprising centrally authenticating by the shared license computer device, one or more licenses issued to the user for one or more corresponding DRM computer system of the user.

78. The method of claim 45, wherein the shared license computer device includes a license interpreter.

79. The method of claim 45, further comprising receiving queries regarding content usage from one or more DRM computer systems of the user, searching for corresponding rights and permitting or denying the content usage based on search results.

80. The method of claim 45, further comprising handling license interpretation and management for a DRM computer system of the user by the shared license computer device.

81. The method of claim 45, further comprising extracting a license from the first DRM computer system to create the first indication of a permitted use.

82. The method of claim 45, further comprising supporting a license in a standardized or in a proprietary format by the shared license computer device and the first DRM computer system.

83. The method of claim 45, further comprising including authentication information and content usage rules in a single license.

84. A shared license computer device having at least one computer readable memory with instructions recorded thereon, said shared license computer device being configured to manage a license on behalf of a user wherein the user is associated with the shared license computer device, said instructions, when executed by at least one processor of the shared license computer device causing the at least one processor to:
receive a first indication of a permitted use, based on a first license, from a first DRM computer system which is external to the shared license computer device, said first DRM computer system being configured to receive a first instance of content and restrict use of the first instance of content, and also being configured to transmit the license to the shared license repository computer device;
transmit a second indication of the permitted use, which based on the first indication of permitted use, to a second DRM computer system which is external to the shared license computer device and the first DRM computer system, said second DRM computer system being configured to receive the second indication of the permitted use from the shared license repository computer device and restrict use of a second instance of the content based on the second indication of the permitted used, wherein-the second instance of the content is not derived from the first instance of the content and wherein the second DRM computer system utilizes an enforcement mechanism that is different than an enforcement mechanism of the first DRM computer system; and
accept license-lifecycle management commands from the user.

85. The shared license computer device as recited in claim 84, wherein said instructions, when executed by at least one processor of the shared license computer device further cause the at least one processor to authentic the user before granting access to the shared license computer device.

86. The shared license computer device as recited in claim 84, further comprising a Web service interface.

87. The device of claim 84, wherein there are a plurality of instances of the first DRM computer system, and the shared license computer device is configured to communicate with the instances of the first DRM computer system.

88. The device of claim 84, wherein there are a plurality of different second DRM computer systems, and the shared license computer device is configured to communicate with the different second DRM computer systems.

89. The device of claim 84, wherein the content use includes content consumption.

90. The device of claim 84, wherein the interface for receiving, the interface for transmitting, and the license management user interface component are implemented on one or more hardware devices.

91. The device of claim 84, wherein the license management user interface component is standardized or proprietary.

92. The device of claim 84, further comprising creating the second indication of a permitted use based on the first indication of a permitted use.

93. The device of claim 84, wherein the license-lifecycle management commands enable the user to manage the content by managing the license associated with the content instead of a specific instance of the content.

94. The device of claim 84, wherein, upon authorization based on the first indication of a permitted case, the device makes the second instance of content available to the user, and adapts the second instance of content to a content consumption environment of the second DRM computer system.

95. The device of claim 84, wherein the license-lifecycle management commands allow the user to access an entirety of licenses of the user.

96. The device of claim 84, the license-lifecycle management commands allow evaluating a plurality of DRM computer systems of the user in an aggregated view, including all licenses owned by the user, and where the licenses are stored.

97. The device of claim 84, wherein license management user interface component is configured to allow the user to add a new license.

98. The device of claim 97, wherein the new license is transmitted.

99. The device of claim 98, wherein the new license is in a format compatible with the DRM computer system of the user.

100. The device of claim 84, wherein license-lifecycle management commands allow the user to browse the shared license computer device.

101. The device of claim 84, wherein the license-lifecycle management commands allow the user to visit a website associated with the content service and configured to push a new license to the shared license computer device.

102. The device of claim 84, wherein the shared license computer device is configured to be pre-loaded with one or more licenses.

103. The device of claim 84, wherein the shared license repository computer device stores one or more licenses associated with one or more DRM computer system, whereby if the corresponding DRM computer system, licenses, content, format or media are lost, damaged, or obsolete, the shared license computer device is configured to use the stored licenses to re-acquire corresponding license, or content adapted to a current content consumption device, format, media, or DRM computer system.

104. The device of claim 84, wherein the shared license computer device is configured to be used in conjunction with an escrow service device that allows the user to exercise a principle of first sale.

105. The device of claim 84, wherein the shared license repository computer device is configured for submitting a license of the user to the escrow service, and revoke the submitted license.

106. The device of claim 105, wherein another party submits money or other consideration, including another license to the escrow service, and the escrow service issues a new license corresponding to the submitted license to the party to complete a sale or exchange transaction associated with the submitted license.

107. The device of claim 84, wherein the shared license computer device is configured to build content usage rules based on a DRM computer system of the user.

108. The device of claim 107, wherein the content usage rules are not based on a license physically stored in a DRM computer system of the user, but instead are based on information about the shared license computer device and the content usage rules at a time that extraction of corresponding content occurs.

109. The device of claim 108, wherein the content usage rules are associated with a content consumption software or device, and which govern use of the corresponding content.

110. The device of claim 109, wherein the content usage rules change with an update or new version of the content consumption software or device.

111. The device of claim 110, further comprising providing information relating to what the content usage rules are at a given time, and record the content usage rules in a DRM expression associated with the shared license computer device, whereby the user can document content usage rules being enforced during periods of time of usage of the corresponding content.

112. The device of claim 84, further comprising analyzing one or more DRM computer systems of the user, and then securely recording licenses associated with the one or more DRM computer systems of the user.

113. The device of claim 112, further comprising securely recording the licenses associated with the DRM computer system in at least one of paper form, as a signed digital document, and offsite storage.

114. The device of claim 113, further comprising using the secure recording to acquire or reissue a lost license or create a new license based on a new DRM computer system of the user.

115. The device of claim 85, further comprising authenticating a license wallet including a biometric characteristic or secure digital certificate associated with the user.

116. The device of claim 85, wherein the authenticating includes biometric authentication of the user.

117. The device of claim 116, wherein the biometric authentication of the user includes thumb print verification of the user.

118. The device of claim 84, further comprising receiving queries regarding content usage from one or more DRM computer systems of the user, searching for corresponding rights and permitting or denying the content usage based on search results.

119. The device of claim 118, further comprising handling license interpretation and management for the DRM computer system of the user.

120. The device of claim 84, wherein the license-lifecycle management commands allow a user to extract or construct an indication of permitted use from a DRM computer system.

121. A computer implemented method for content use comprising:
receiving, by a shared license computer device, a first indication of a permitted use, based on a first license, from a first DRM computer system which is external to said shared license computing device, said first DRM computer system being configured to receive a first instance of content and restrict use of the first instance of the content;

transmitting, by the shared license computer device, a second indication of the permitted use, which is based on the first indication of permitted use, to a second DRM computer system which is external to said shared license computing device and the first DRM computer system, said second DRM computer system being configured to receive the second indication of the permitted use from the shared license computer device and restrict use of a second instance of the content based on the second indication of the permitted use, wherein-the second instance of the content is not derived from the first instance of the content and wherein the second DRM computer system utilizes a enforcement mechanism that is different than an enforcement mechanism of the first DRM computer system; and accepting license-lifecycle management commands from the user.

122. The method of claim 121, wherein the shared license computing device comprises multiple computing devices.

123. The method of claim 121, wherein the shared license computing device comprises a single computing device.

* * * * *